United States Patent [19]
Kumai et al.

[11] Patent Number: 5,634,134
[45] Date of Patent: May 27, 1997

[54] METHOD AND APPARATUS FOR DETERMINING CHARACTER AND CHARACTER MODE FOR MULTI-LINGUAL KEYBOARD BASED ON INPUT CHARACTERS

[75] Inventors: Hiroyuki Kumai; Jun Ito, both of Yokohama; Akira Nakajima; Yasumasa Matsuda, both of Tokyo-to; Shigeki Taniguchi, Hitachi; Hirobumi Kashiwa, Hitachi; Toyokazu Suzuki, Hitachi; Masaki Kawase, Katsuta, all of Japan

[73] Assignee: Hitachi, Ltd., Tokyo, Japan

[21] Appl. No.: 901,236

[22] Filed: Jun. 19, 1992

[30] Foreign Application Priority Data

Jun. 19, 1991 [JP] Japan .................. 3-147117

[51] Int. Cl.⁶ ................ G06F 17/21; G06F 3/14
[52] U.S. Cl. .................. 395/798; 395/758
[58] Field of Search ............ 364/419.02, 419.03, 364/419.14, 419.08, 419.07, 419.06, 419.16, 419.09, 419.12

[56] References Cited

U.S. PATENT DOCUMENTS

| | | | |
|---|---|---|---|
| 4,124,843 | 11/1978 | Bramson et al. | 340/337 |
| 4,328,561 | 5/1982 | Convis et al. | 364/900 |
| 4,384,503 | 5/1983 | Gunn | 84/1.01 |
| 4,393,460 | 7/1983 | Masuzawa et al. | 364/900 |
| 4,408,302 | 10/1983 | Fessel et al. | 364/900 |
| 4,459,581 | 7/1984 | Wilson et al. | 340/365 VL |
| 4,559,598 | 12/1985 | Goldwasser et al. | 364/419 |
| 4,580,916 | 4/1986 | Rolfo et al. | 400/109 |
| 4,761,761 | 8/1988 | Sekiguchi | 364/419.15 |
| 4,829,580 | 5/1989 | Church | 381/52 |
| 4,831,550 | 5/1989 | Katz | 364/513.5 |
| 5,040,218 | 8/1991 | Vitale et al. | 381/52 |
| 5,075,896 | 12/1991 | Wilcox et al. | 382/39 |
| 5,127,748 | 7/1992 | Okimoto et al. | 400/70 |
| 5,157,606 | 10/1992 | Nagashima | 364/419 |
| 5,159,644 | 10/1992 | Martin et al. | 382/14 |
| 5,226,148 | 7/1993 | Littlewood | 395/575 |
| 5,251,129 | 10/1993 | Jacobs et al. | 364/419.08 |
| 5,251,131 | 10/1993 | Massand et al. | 364/419 |
| 5,258,909 | 11/1993 | Damerau et al. | 364/419.22 |
| 5,270,927 | 12/1993 | Sproat | 364/419.09 |
| 5,278,980 | 1/1994 | Pedersen et al. | 395/600 |
| 5,331,556 | 7/1994 | Black, Jr. et al. | 364/419.08 |

FOREIGN PATENT DOCUMENTS

| | | |
|---|---|---|
| 61-231624 | 10/1986 | Japan . |
| 62-58358 | 3/1987 | Japan . |
| 63-211463 | 9/1988 | Japan . |
| 1-233560 | 9/1989 | Japan . |
| 2-30223 | 1/1990 | Japan . |

*Primary Examiner*—Gail O. Hayes
*Assistant Examiner*—Steven R. Yount
*Attorney, Agent, or Firm*—Antonelli, Terry, Stout & Kraus, LLP

[57] ABSTRACT

A method and apparatus for determining at least one of a character and a destination therefor in accordance with a received signal representing at least one of a plurality of characters and at least one character corresponding to at least one of a plurality of languages. Likelihood values for at least one of plurality of characters and each of the languages are evaluated, and at least one of the plurality of characters and one of the character languages are selected in accordance with the evaluated likelihood values thereof.

40 Claims, 22 Drawing Sheets

| G | ) | G | ) | $ | T | E | W | ' |
|---|---|---|---|---|---|---|---|---|
| き | す | き | す | う | か | い | を | @ |
|   | 9 |   | 9 | 4 |   |   |   | ` |

INPUT CHARACTER STRING AND CHARACTER MODE HAVE BEEN CHANGED INTO HIRAGANA. TO REVERSE THE PROCESS, PRESS "★" AND "NO CONVERSION" KEYS TOGETHER.

IS INPUT MODE CORRECT? CHARACTER MODE OF INPUT CHARACTER STRING MAY BE CHANGED BY PRESSING "★" AND "NO CONVERSION" KEYS TOGETHER.

CHARACTERS ARE CORRECTED.
CHECK YOUR HOME POSITIONS.

ARE YOUR HOME POSITIONS CORRECT?

FIG. 25

| | a | i | u | e | o | -ya | -yu | -yo |
|---|---|---|---|---|---|---|---|---|
| | HIRA-GANA ( KATA-KANA ) | | | | | | | |
| | あ (ア) a | い (イ) i | う (ウ) u | え (エ) e | お (オ) o | | | |
| k | か (カ) ka | き (キ) ki | く (ク) ku | け (ケ) ke | こ (コ) ko | きゃ (キャ) kya | きゅ (キュ) kyu | きょ (キョ) kyo |
| s | さ (サ) sa | し (シ) si | す (ス) su | せ (セ) se | そ (ソ) so | しゃ (シャ) sya(sha) | しゅ (シュ) syu(shu) | しょ (ショ) syo(sho) |
| t | た (タ) ta | ち (チ) ti | つ (ツ) tu | て (テ) te | と (ト) to | ちゃ (チャ) tya(cha) | ちゅ (チュ) tyu(chu) | ちょ (チョ) tyo(cho) |
| n | な (ナ) na | に (ニ) ni | ぬ (ヌ) nu | ね (ネ) ne | の (ノ) no | にゃ (ニャ) nya | にゅ (ニュ) nyu | にょ (ニョ) nyo |
| h | は (ハ) ha | ひ (ヒ) hi | ふ (フ) hu | へ (ヘ) he | ほ (ホ) ho | ひゃ (ヒャ) hya | ひゅ (ヒュ) hyu | ひょ (ヒョ) hyo |
| m | ま (マ) ma | み (ミ) mi | む (ム) mu | め (メ) me | も (モ) mo | みゃ (ミャ) mya | みゅ (ミュ) myu | みょ (ミョ) myo |
| y | や (ヤ) ya | | ゆ (ユ) yu | | よ (ヨ) yo | | | |
| r | ら (ラ) ra | り (リ) ri | る (ル) ru | れ (レ) re | ろ (ロ) ro | りゃ (リャ) rya | りゅ (リュ) ryu | りょ (リョ) ryo |
| w | わ (ワ) wa | ゐ (ヰ) wi | う (ウ) wu | ゑ (ヱ) we | を (ヲ) wo | | | |
| | ん (ン) nn | | | | | | | |
| g | が (ガ) ga | ぎ (ギ) gi | ぐ (グ) gu | げ (ゲ) ge | ご (ゴ) go | ぎゃ (ギャ) gya | ぎゅ (ギュ) gyu | ぎょ (ギョ) gyo |
| z | ざ (ザ) za | じ (ジ) zi | ず (ズ) zu | ぜ (ゼ) ze | ぞ (ゾ) zo | じゃ (ジャ) zya | じゅ (ジュ) zyu | じょ (ジョ) zyo |
| d | だ (ダ) da | ぢ (ヂ) di | づ (ヅ) du | で (デ) de | ど (ド) do | ぢゃ (ヂャ) dya | ぢゅ (ヂュ) dyu | ぢょ (ヂョ) dyo |
| b | ば (バ) ba | び (ビ) bi | ぶ (ブ) bu | べ (ベ) be | ぼ (ボ) bo | びゃ (ビャ) bya | びゅ (ビュ) byu | びょ (ビョ) byo |
| p | ぱ (パ) pa | ぴ (ピ) pi | ぷ (プ) pu | ぺ (ペ) pe | ぽ (ポ) po | ぴゃ (ピャ) pya | ぴゅ (ピュ) pyu | ぴょ (ピョ) pyo |

METHOD AND APPARATUS FOR DETERMINING CHARACTER AND CHARACTER MODE FOR MULTI-LINGUAL KEYBOARD BASED ON INPUT CHARACTERS

BACKGROUND OF THE INVENTION

The present invention relates to a character processing and inputting apparatus and method for word processors and for inputting characters therethrough. More particularly, the invention relates to an apparatus and a method for selecting and inputting an appropriate character or language type through the changeover of character modes when different characters or language types are capable of being inputted, processed or displayed.

Prior art character inputting apparatuses used in word processors most often permit entry of characters through a keyboard. In addition to its character keys, the keyboard includes various function keys for designating and executing a variety of functions. One typical character inputting apparatus for Japanese word processors has a character mode designating key that the user operates to select one of a plurality of characters or language types. All Japanese words are transcribed by hiragana and katakana characters which correspond to Roman characters. FIG. 25 shows typical correspondence between hiragana (katakana) characters and Roman characters. One such character mode designating key when operated selects for user input any of multiple character modes including alphanumeric character mode, hiragana character mode, katakana character mode and symbol mode. Language translating machines addressing a plurality of languages have a language selecting key. This key allows the user to designate the language into which to translate the character string that is input or to be input by the user. As outlined above, these and many other prior art character handling apparatuses require performing not only simple key operations for character input from the keyboard but also additional operations before or after the character input. The additional operations include designating the character and specifying the language type.

Illustratively, where Japanese words and sentences are input, there often occurs the mingling of different character such as alphanumeric characters, hiragana characters and katakana characters. The user is required to stay aware of the current character mode for the proper input of desired characters. This requirement has proved to be a considerable burden on the user's part. There are two ways to input Japanese words and sentences: (1) Roman character input method for use with the English language keyboard arrangement; and (2) Kana character input method for use with the Japanese language keyboard arrangement. These input methods are generally switched using mode designating keys. For some novices unfamiliar with Japanese word processing, the operation of such designating keys is so complicated that they are unable use the word processor.

One method for solving the above problem is proposed by Japanese Patent Application Laid-Open No. 61-231624. This method involves correcting the characters erroneously input by the user through designation of appropriate character code conversion. Another method, disclosed in Japanese Patent Application Laid-Open No. 62-58358, involves having a specific character mode established as the default mode and issuing an alarm if a certain number of characters are input in a character mode other than the default mode.

On language translating machines for translating a first language (e.g., German, French or Italian) into a second language (e.g., Japanese), the user typically designates the first language before translation can take place. For example, after inputting a character string "Auf Wiedersehen", the user designates "German." This allows the character string to be translated into its Japanese equivalent "さよう なら". Likewise, with an English sentence "How do you do?" input, designating the language type "English" translates the sentence into its Japanese equivalent "はじめ まして".

Japanese Patent Application Laid-Open No. 63-211463 discloses a system in which reference is made to a dictionary in the appropriate language to determine whether the inputted characters form a word in English or Japanese. Japanese Patent Application Laid-Open No. 1-233560 discloses an automatic translator for voice input using probability summation of a word format and normally translates voice in the Japanese language to English, but does not translate if the voice is in the English language. Further, the translation is effected on a clause or plural word basis. Japanese Application Laid-Open No. 2-30223 recognizes key input and, based upon a dictionary, determines the appropriate language and provides an output on a word basis while also referring to a specific relation of a letter position within a word. These disclosures thus generally utilize word type dictionaries in appropriate languages for effecting recognition and/or translation.

The use of keyboards almost inevitably entails another problem: typographical errors. The most widespread keyboard arrangement is one comprising about 50 keys that are operated with both hands. Keyboards of this type typically have four tiers of keys, each tier containing from 12 to 14 keys. When the user types in "blind touch" fashion on the keyboard while copying a manuscript, typographical errors are more or less inevitable. One way to minimize such errors is to equip the keyboard with specific keys (e.g., home position keys) marked with depressions or bumps for tactile verification of the correct key positions. Another way to address typographical errors is to run a dictionary-based spelling check on the input words whereby the user finds and corrects wrong spellings.

Some machines when interconnected are faced with the problem of how to handle different character code systems that may exist therebetween. In stand-alone situations, the machines may use whatever character code system that are unique to them. When interconnected, these machines may have difficulty in communicating with one another using different character codes. For example, a character string transmitted from one machine may appear as a meaningless collection of symbols on the receiving machine that uses a character code system different from that of the transmitting machine. One way to solve this problem is to establish common communication protocols between the machines involved so that mutually agreed-on character code system is utilized throughout the transmission and reception therebetween.

One disadvantage of the prior art method disclosed by Japanese Patent Laid-Open No. 61-231624 is that unless the user verifies the presence of the error committed and knows the procedure for character mode changeover, erroneously input characters cannot be corrected. A drawback of the method disclosed by Japanese Patent Laid-Open No. 62-58358 is that the alarm is triggered merely according to the number of characters input, regardless of whether or not the input by the user is correct. Even if the alarm is relevant, unless the user knows the appropriate procedure for character mode designation, the correct input mode cannot be selected.

SUMMARY OF THE INVENTION

It is therefore an object of the present invention to provide a method and an apparatus for judging the character mode likelihood of a string of characters keyed in by the user, automatically detecting a mode setting error based on the judgment, setting the correct mode accordingly, changing the already input character string into characters of the correct mode, and issuing a relevant message at the same time. In this manner, the invention provides the user with a method and an apparatus for alleviating some burdens of character input.

As mentioned, the major problem with the machines for translating a plurality of languages is that the user is required not only to perform steps to designate the first (i.e., source) language, but also to know beforehand the type of that first language. Such requirements turn out to be a considerable burden on the user's part.

Thus, it is another object of the invention to provide a method and an apparatus for judging the language type of an input character string without user intervention, the judging being based on the likelihood value of the input character string obtained for each of a plurality of character or language types, whereby the intended result of translation is acquired.

As mentioned, the prior art solution to typographical errors is generally the tactile verification of the home position keys. This solution requires the user to remain vigilant at all times during key input. Once the home position keys are missed, the user may continuously type incorrect character strings until he views the screen for confirmation. Another solution, the dictionary-based spelling check, puts a heavy burden on the processor. If carried out during character input, the spelling check will considerably reduce the operability of the machine because the spelling-check processing takes time and affects other operations. For this reason, the spelling check is typically carried out in a single pass on a certain batch of word processing completed. But this way of checking typographical errors afterwards leaves unsolved the problem of how to deal with typographical errors as they occur in real time.

Given the above problem, it is a further object of the invention to provide a method and an apparatus for inputting characters in a way that relieves the user of the burden that the user has conventionally shouldered in addressing typographical errors, the method and the apparatus being capable of judging the likelihood value of a user-input character string, of automatically detecting an inadvertent fingertip shift from the home position, of changing the already input character string to a correct character string applicable to the error pattern detected, and of displaying a relevant message at the same time.

The problem of incompatibility in character code systems between different machines is addressed conventionally by use of standard protocols. Although physical standard protocols are now widely accepted and employed, the protocols for designating character code systems have not yet received standardized widespread acceptance. As a result, no communication is possible unless a user who wants to transmit signals knows the receiver's protocol.

Given this problem, it is yet another object of the invention to provide a method and an apparatus for processing characters, the method and the apparatus being capable of judging the likelihood value of a character string of received codes for each of a plurality of character code systems, of automatically judging the transmitting party's character code system based on the likelihood values obtained, and of automatically converting the character string to the receiving party's character code system for display if the latter system is different from the transmitting party's system.

In this manner, the invention offers methods and apparatuses for judging the likelihood values of user-input keys and carrying out processing based on the result of the judgment so that the result intended by the user will be obtained.

In accordance with the present invention, there is provided a character inputting apparatus including a signal storage device for storing input signals, a likelihood judging device for judging the likelihood value of the input signals, and a controlling device for switching to an appropriate process in accordance with the result of the judging by the likelihood judging device.

In operation, the signal storage device stores sequentially the signals it has received. The likelihood judging device finds the likelihood value of the signal string that is input. Based on the findings, the likelihood judging device determines the likeliest character mode, language type, typographical error pattern or character code system. In accordance with what is likeliest, the controlling device switches to the process applicable to the signals stored by the signal storage device. In this manner, the user may proceed with character input operations without giving explicit instructions as to the character string to be input or received.

These and further objects, features and advantages of the present invention will become more obvious from the following description when taken in connection with the accompanying drawings which show for purposes of illustration only, several embodiments in accordance with the present invention.

BRIEF DESCRIPTION OF THE DRAWINGS

FIG. 3 is a view of a keyboard for use with the apparatus of FIG. 2;

FIGS. 6(A) and 6(B) show different key input examples;

FIGS. 21(A) and 21(B) show character keyboard arrangements and corresponding key codes therefor, respectively, for another embodiment of the present invention;

FIG. 25 is a table showing correspondence between hiragana (katakana) characters and Roman characters.

DESCRIPTION OF THE PREFERRED EMBODIMENTS

Figure 1A:
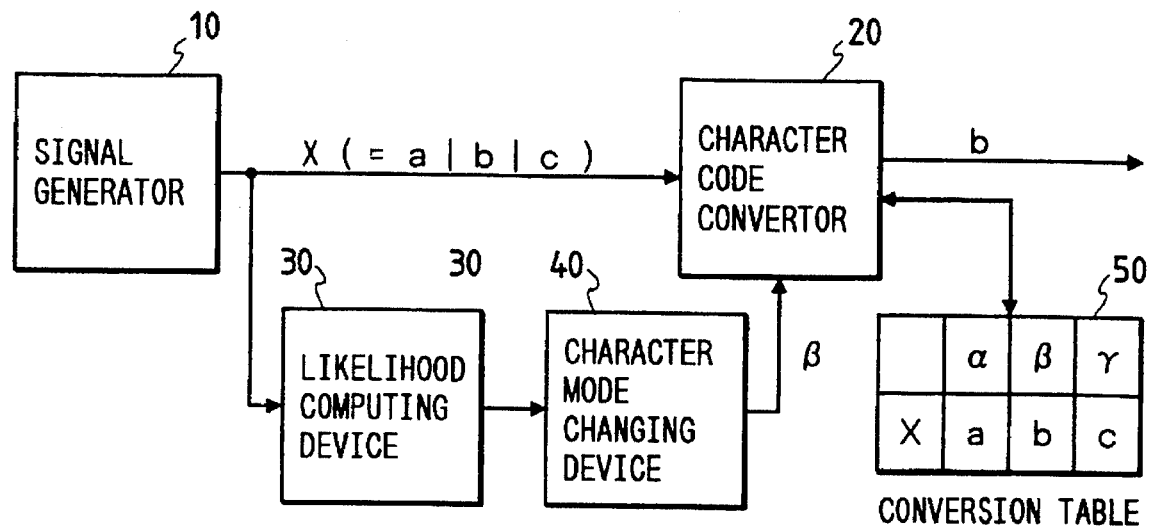
FIGS. 1(A) and 1(B) illustrate block diagram arrangement of the present invention.

Referring now to the drawings, there is described an embodiment of the method and apparatus for automatically judging and correcting a mode setting error wherein the likelihood judging device will be referred to as character mode likelihood judging device and the signal storage device as a key code storage device.

FIG. 1 is a block diagram of the present invention including a signal generator 10 which first generates signals X representing character codes (a, b, c) for a plurality of characters or language types ($\alpha$, $\beta$, $\gamma$). The signals X are input to character code convertor 20 and likelihood computing device 30. Given the signals X and a character (of a character mode), the character code convertor 20 references a conversion table 50 to output a unique character code therefrom. The likelihood computing device 30 computes the likelihood corresponding to the input signals X by use of a likelihood table, not shown. The result of the computation is sent to character mode changing device 40. Upon receipt of the computed likelihood, the character mode changing device 40 changes the character (character modes) and reports the newly established character (character code) to the character code convertor 20. In operation, for example, the character mode changing device 40 sends the character (character mode) $\beta$ to the character code convertor 20. In turn, the character code converter 20 references the conversion table 50. This causes the signals X to be converted to a character code b for output.

Figure 1B:
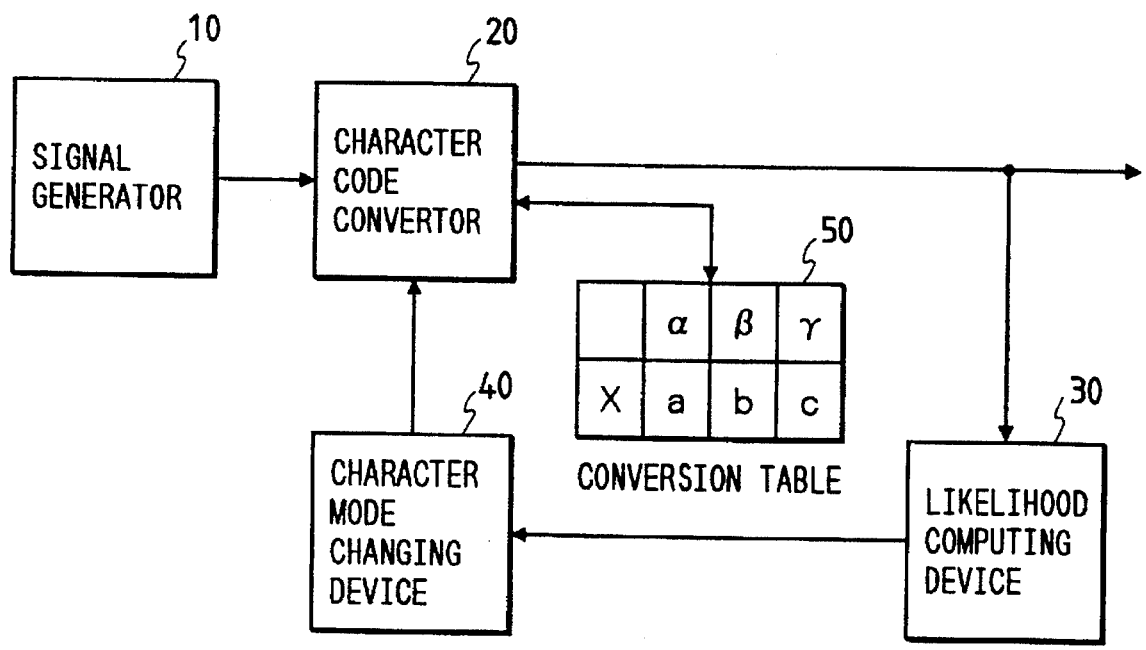

FIG. 1(B) is a block diagram of an alternative embodiment wherein the likelihood of the character code converted by character code convertor is computed and the character mode is changed accordingly. The embodiment of FIG. 1(A) has an advantage of gaining enhanced reliability of the likelihood computed by the likelihood computing device because the signal data is evaluated as received. On the other hand, the embodiment offers a wider range of applications because it judges already input characters for their likelihood.

Figure 2:
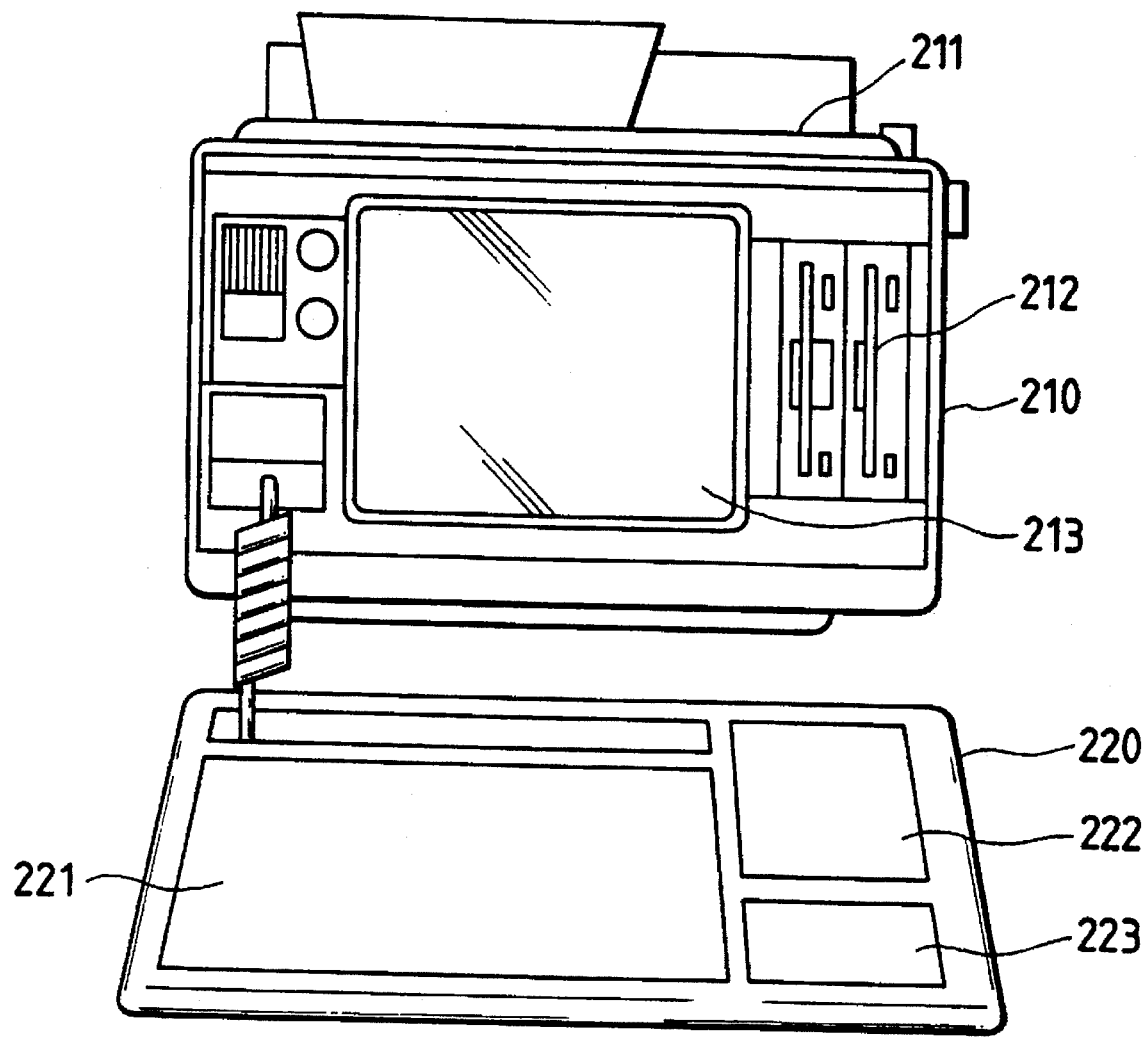
FIG. 2 is a perspective view of a character inputting apparatus in accordance with the present invention.

FIG. 2 is a perspective view of a character inputting apparatus embodying the invention in accordance with FIG. 1(A) and incorporated illustratively in a word processor. The apparatus of FIG. 2 contains basic functions of word processing, and comprises a body 210 made up of electronic circuits and other associated components and an input device 220 from which to input characters and instructions. A display unit 213 displays entered character strings and messages for the user. Although not indispensable, there may also be provided a printer 211 for outputting entered and/or edited character strings onto paper and an auxiliary storage unit 212 that stores the input and/or edited character strings onto a storage medium such as a floppy disk. The input device 220 comprises character keys for inputting characters, mode designating keys for designating an input character font, function keys for issuing editing instructions regarding character strings, and position designating keys for designating the target character string to be edited. For the ease of operation, these keys are divided into a plurality of key blocks such as those numbered 221, 222 and 223.

Figure 3:
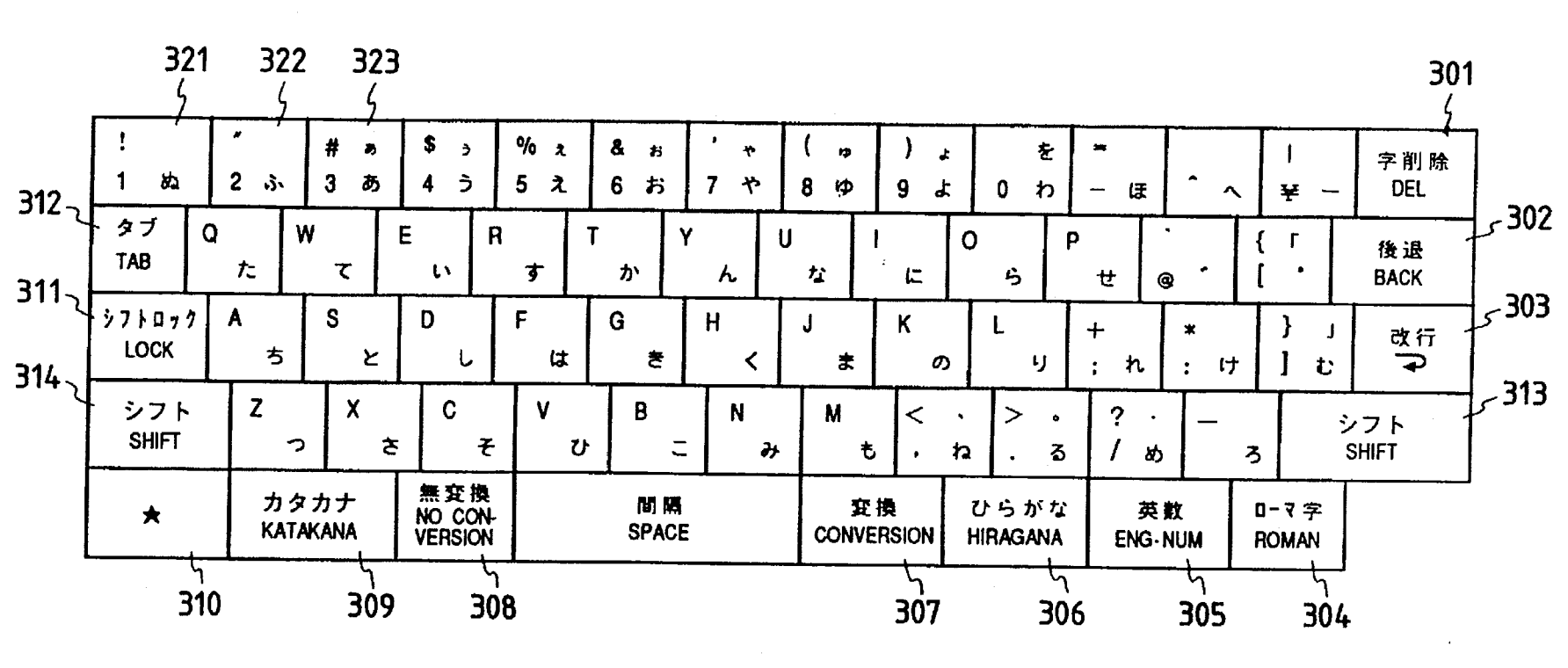

FIG. 3 shows a typical arrangement of the key block 221 on the input device 220 of FIG. 2. Keys 301, 302, 303, 304, 305, 306, 307, 308, 309, 310, 311, 312, 313 and 314 in FIG. 3 are the function keys and character mode designating keys used to designate a character or language type and to perform such editing functions as line feed and character deletion. Other keys 321, 322, 323, etc. are the character keys for inputting characters. The key 310 is a function shift key used in combination with other function keys. With this embodiment, pressing simultaneously the keys 310 and 308 inputs a user-initiated character code conversion instruction, to be described later.

Figure 4:
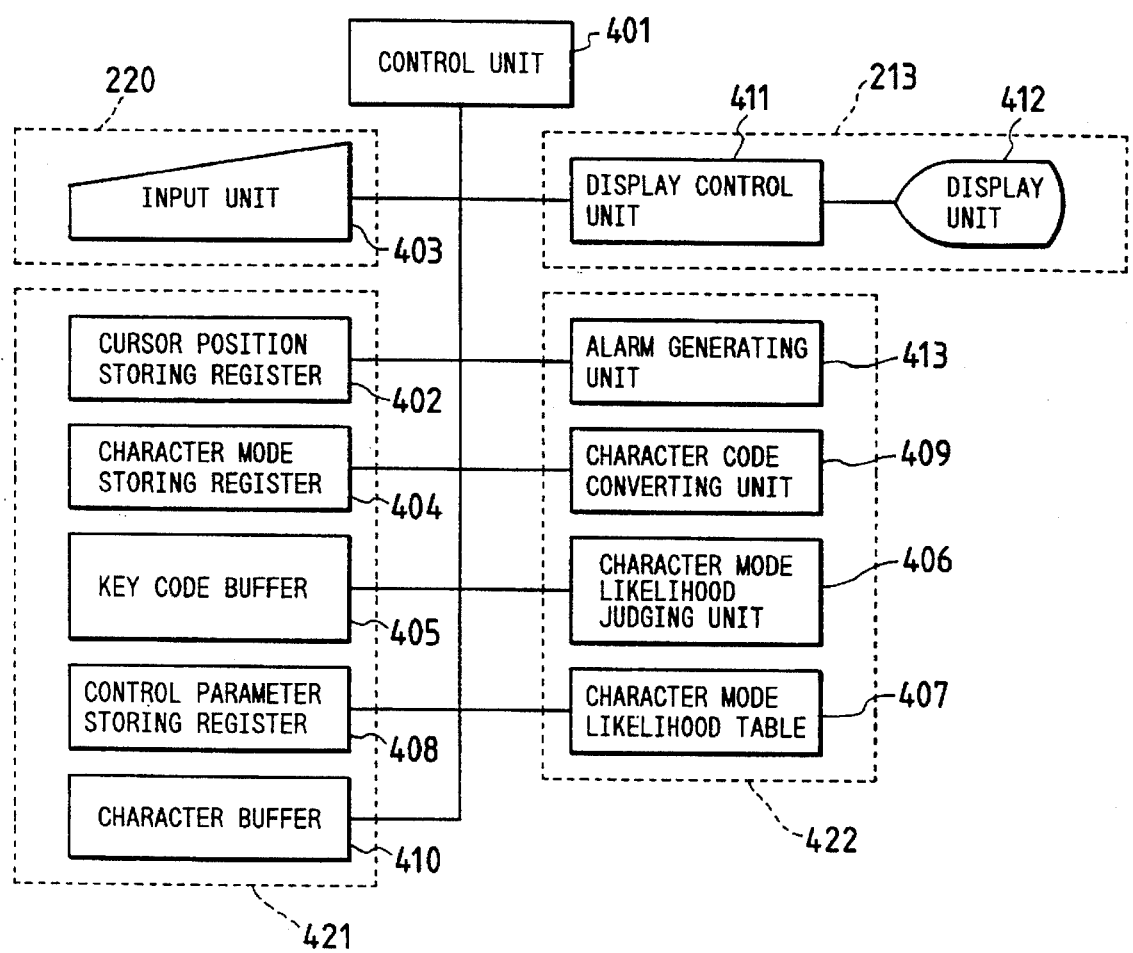
FIG. 4 is a more detailed block diagram of the arrangement of FIG. 1(A)

FIG. 4 is a more detailed block diagram of the embodiment of the invention of FIG. 1(A). In FIG. 4, a control unit 401 such as a microprocessor controls the entire operation of the apparatus. A cursor position storing register 402 stores the position of a target character string to be replaced during character editing or under the character inputting method according to the invention. An input unit 403 corresponding to the signal generator 10 permits the input of character keys and function keys for editing instruction. The input unit 403 generates key codes (to be described later) as the signals X. A character mode storing register 404 stores the character mode for determining which character code (to be described later) the key codes of the character keys entered from the input unit 403 should be converted into. In conjunction with the control unit 401, the character mode storing register 404 constitutes the character mode changing device 40. A key code buffer 405 temporarily stores a key code string of character keys on a time series basis. A character mode likelihood judging unit 406 judges the likeliest character mode according to the key code string held in the key code buffer 405 and by referring to a character mode likelihood table 407. The character mode likelihood table 407 contains the likelihood value, for each character mode, of each key code referenced by the character mode likelihood judging unit 406. The character mode likelihood judging unit 406 and the character mode likelihood table 407 combine to correspond to the likelihood computing device 30. A control parameter storing register 408 stores control parameters for determining the entire flow of processing. A character code converting unit 409 converts key codes into character codes as per the currently designated character mode. A character buffer 410 is connected to a display control unit 411 that displays the contents of the buffer on a display unit 412. The display unit 412 is, for example, a CRT or an LCD that presents the user with the result of character input and editing as well as with messages. An alarm generating unit 413 generates an alarm message and alters parameters in the control parameter storing register 408 when the control unit 401 decides to give the user an alarm based on the judgment by the character mode likelihood judging unit 406. With this embodiment, the alarm generating unit 413 performs in the form of alarm generation processing a series of operations necessitated as a result of the judgment by the character mode likelihood judging unit 406. When configured as hardware, the block-by-block arrangement of the invention will have the block 421 implemented as a storage unit to and from which to write and read data, and the block 422 as a storage unit from which at least data may be read. The control unit 401 may be implemented as a general-purpose processor.

Figures 10A, 10B, 11:
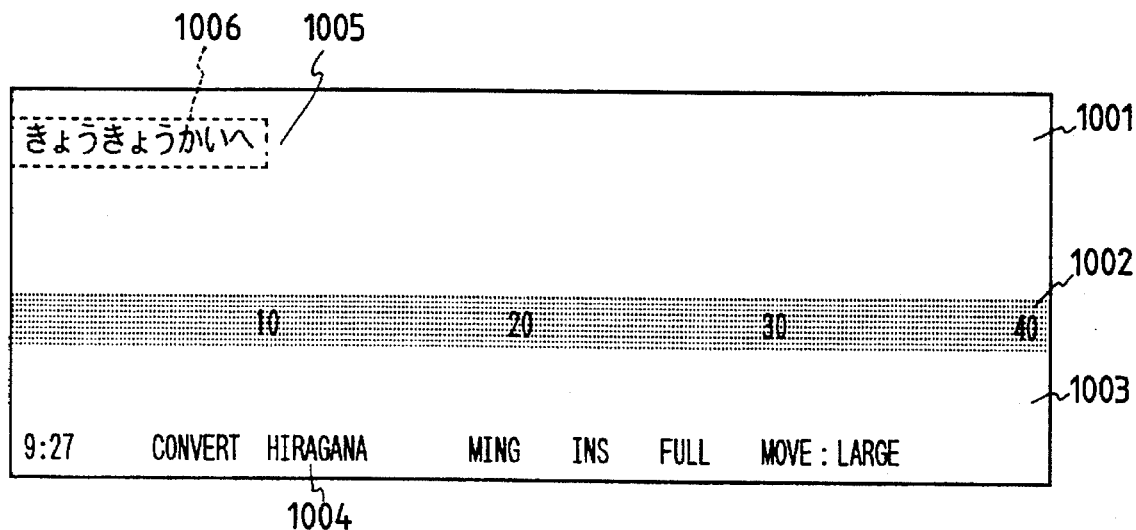
FIGS. 10(A) and 10(B) show typical output messages provided in accordance with the present invention.
FIG. 11 shows a screen display example in accordance with the present invention.

FIG. 11 shows an example of a screen as presented by the display unit 412. In FIG. 11, a text area 1001 displays character strings held in the character buffer 410. A column indicator 1002 indicates the column positions for the characters displayed. A guidance area 1003 furnishes the user with messages and the status of the apparatus. A guidance indication 1004 indicates the currently designated character mode, to be described later. A cursor indication 1005 indicates the character input position. An already input character string 1006 shown on the screen is held in the character buffer 410.

The relation of character keys to the designated character mode will now be described with respect to FIG. 3 and Table 1. In FIG. 3, the character key 323 has four characters engraved thereon: 3, #, き, and き. These characters respectively represent alphanumeric characters, alphabetic symbols, kana characters, and kana symbols. The character mode designating keys 305, 306 and 307 are used to designate which character or language type the key input should comply with. On the character inputting apparatus embodying the invention, the hiragana mode designating key 306, the katakana mode designating key 309 and the alphanumeric mode designating key 305 operate in a mutually exclusive manner. Once depressed, each of the three keys causes character codes to be generated according to the corresponding character mode unless and until another character mode designating key is operated. The shift keys 314 and 313 are each pushed simultaneously with a character key. When the alphabetic mode is in effect, the shift key operated in the above manner causes the character code of the alphabetic symbol of the simultaneously pressed character key to be generated; when the hiragana or katakana mode is in effect, the shift key permits generation of the character code of the kana symbol of the simultaneously pressed character key. For example, after the hiragana mode designating key 306 is pressed, typing the character key 323 alone generates the character code representing the character き. If pressed simultaneously with the shift key, the character key 323 causes the character code of the character き to be generated. This status remains in effect until the katakana mode designating key 309 or the alphanumeric mode designating key 305 is pressed. Table 1 lists the character codes that are generated when the character key 323 is pressed in various character modes.

| Character Mode | Character Code |
| --- | --- |
| Roman character-to-hiragana | 3 |
| Kana-to-hiragana | |
| Roman character-to-katakana | 3 |
| Kana-to-katalana | |
| Alphanumeric | 3 |

The operation of Roman character mode designating key 304 will now be described. This key is used to designate the way in which to input hiragana and katakana characters. Repeatedly pressing the key 304 designates alternately one of two methods; Roman character input method or kana input method. The Roman character input method is a known character converting method that converts the Romanized Japanese spelling entered through an alphanumeric keyboard into kana characters. For example, if Roman characters "kyo" are typed, the apparatus internally converts the spelling into "きょ". The kana input method, on the other hand, allows katakana or hiragana characters to be input exactly as they are typed on a kana keyboard. Conversion of Roman character spelling into kana characters is carried out by the character code converting unit 409. Hereafter, the hiragana character mode under the Roman character input method is referred to as the Roman character-to-hiragana mode; the katakana character mode under the Roman character input method, as the Roman character-to-katakana mode; the hiragana character mode under the kana input method, as the kana-to-hiragana mode; and the katakana character mode under the kana input method, as the kana-to-katakana mode.

The invention is not limited to the above-described apparatus, but is applicable to any apparatus that permits character input through the use of keys. Although the key block arrangement of FIG. 3 complies with JIS X6002, the invention may be practiced with any other keyboard arrangement.

During character inputting, it may be that in a word processing session, the user may erroneously operate or fail to operate any mode designating key and may type keys in the wrong mode (e.g., the user fails to push the alphanumeric mode designating key 305 and inputs English words while the hiragana character mode is still in effect). In such a case, the method according to the invention automatically judges the correct mode and warns the user of the error committed. Referring to the flowchart of FIG. 5, the operation is such that the apparatus enters a key input wait state when started. In step 101, the user operates a key. In step 102, the type of the key operated is checked and determined. If the input key is a character key, step 103 is reached; if the input key is a function key or a mode designating key, step 110 is reached, the operation of which will be described later.

In step 103, a control parameter 1 is referenced. The control parameter 1 is a parameter that determines whether or not character mode likelihood judgment and alarm generation are to be carried out. If the control parameter 1 contains "2", neither character mode likelihood judgment nor alarm generation is performed, and step 108 is reached. In step 108, character input processing alone is carried out. If the control parameter contains "1", step 104 is reached in which character mode likelihood judgment and alarm generation are effected. The control parameter 1 will be described later in more detail.

In step 104, the key codes of input keys are turned into a string of key codes for storage into the key code buffer 405. In step 105, character mode likelihood judgment (to be described later) is carried out with reference to the key code string held in the key code buffer 405. In step 106, a check is made to see if the judged character mode is the same as the currently established character mode. If the judged character mode is the same as the .current character mode or if the judgment is impossible to make, step 108 is reached. If the judged character mode differs from the currently established character mode, step 107 is reached in which alarm processing is carried out. Details of the alarm processing will be described later. Step 107 is followed by step 108. In step 108, the input key codes are converted to character codes according to the established character mode. In step 109, the converted character codes are stored into the character buffer 410. After step 109, step 101 for key input processing is again reached. The process above is repeated until the user operates a function key for terminating the character input processing or document editing. Operating that function key terminates the process as step 111 is reached.

For the character mode likelihood judgment processing, reference is made to the keyboard of FIG. 3. On the keyboard of FIG. 3, keys are typed in the order depicted in FIG. 6(A) so as to input a Japanese character string "きょう きょう かいで". If the kana-to-hiragana character mode is currently in effect, the desired character string "きょう きょう かいで" is made available. However, if the user fails to designate the appropriate character mode and proceeds to operate the keys of FIG. 6(A) while the alphanumeric character mode is still in effect, the result is an unintelligible character string "g)4g)4tew@." In another example, if the user operates keys in the order shown in FIG. 5 (B) to input an English word "information" but fails to leave the current kana-to-hiragana character mode, the result is a meaningless Japanese character string "にみは らすも ちにら み". The frequency of each alphabetic character appearing in English documents and the frequency of each kana character in Japanese documents are found to be statistically constant, with only minor variations experienced from document to document. There are a number of methods for obtaining such frequencies. One such method verifies the number of times each character occurs in documents. Another method involves acquiring the number of combinations of adjacent characters occurring in documents. With this embodiment, the likeliest mode of a given character string is judged primarily on the basis of the number of times each character occurs in documents. The likelihood value of a given character string is obtained as follows:

The frequency of occurrence Pa of each character "a" is acquired beforehand for each character mode. The likelihood value V of the character string in question is computed by inserting illustratively into the following formula the frequency Pa of each character contained in that character string:

$$V = R \sum_a \log Pa$$

where, R is a value which is specific to each character mode and which is used to normalize the likelihood values V for comparison therebetween in absolute terms. Comparing the values V between them makes it possible to compare character strings to see which character string is more likely to occur. For example, the above-mentioned character string "きょう きょう かいで" is compared with the character string "g)4g)4tew@" for likelihood.

The likelihood value of the character string in question is obtained for each of the different character modes. A check is then made to determine if the currently established character mode is correct for the character string. This is where the character mode likelihood judgment processing comes in. This processing will now be described below. First, the character mode likelihood table 407 for use in the character mode likelihood judgment processing will be explained.

TABLE 2-A

Character Mode Likelihood Table

| | Mode | | | | | | | | |
|---|---|---|---|---|---|---|---|---|---|
| | Roman character to hiragana | | Kana to hiragana | | Roman character to katakana | | Kana to katakana | | English and numerals |
| Key Code | Character Code | Evaluated value | Character Code | Evaluated value | Character Code | Evaluated value | Character Code | Evaluated value | Character Code | Evaluated value |
| 01 | 1 | 0 | ぬ | 0 | 1 | 0 | ヌ | 3 | 1 | 0 |
| 02 | 2 | 0 | ふ | 30 | 2 | 0 | フ | 53 | 2 | 0 |
| 03 | 3 | 0 | あ | 49 | 3 | 0 | ア | 44 | 3 | 0 |
| 04 | 4 | 0 | う | 78 | 4 | 0 | ウ | 62 | 4 | 0 |
| 05 | 5 | 0 | え | 36 | 5 | 0 | エ | 45 | 5 | 0 |
| 06 | 6 | 0 | お | 46 | 6 | 0 | オ | 42 | 6 | 0 |
| 07 | 7 | 0 | や | 29 | 7 | 0 | ヤ | 34 | 7 | 0 |
| 08 | 8 | 0 | ゆ | 48 | 8 | 0 | ユ | 38 | 8 | 0 |
| 09 | 9 | 0 | よ | 59 | 9 | 0 | ヨ | 30 | 9 | 0 |
| 10 | 0 | 0 | わ | 32 | 0 | 0 | ワ | 41 | 0 | 0 |
| 11 | - | 0 | は | 33 | - | 0 | ホ | 64 | - | 0 |
| 12 | ^ | 0 | へ | 14 | ^ | 0 | ヘ | 45 | ^ | 0 |
| 13 | ー | 0 | ー | 0 | ー | 89 | ー | 89 | ¥ | 0 |
| 14 | q | 0 | た | 60 | q | 0 | タ | 37 | q | 0 |
| 15 | w | 47 | て | 58 | w | 25 | テ | 65 | w | 50 |
| 16 | e | 78 | い | 80 | e | 80 | イ | 67 | e | 90 |
| 17 | r | 69 | す | 54 | r | 66 | ス | 48 | r | 71 |
| 18 | t | 79 | か | 66 | t | 43 | カ | 73 | t | 91 |
| 19 | y | 65 | ん | 75 | y | 51 | ン | 85 | y | 12 |
| 20 | u | 88 | な | 54 | u | 81 | ナ | 36 | u | 61 |
| 21 | i | 89 | た | 60 | i | 86 | ニ | 38 | i | 82 |
| 22 | o | 90 | ら | 45 | o | 88 | ラ | 55 | o | 83 |
| 23 | p | 25 | せ | 48 | p | 42 | セ | 43 | p | 84 |
| 24 | @ | 0 | ゜ | 65 | @ | 0 | ゜ | 62 | @ | 0 |
| 25 | ｢ | 0 | 。 | 25 | ｢ | 0 | 。 | 56 | [ | 0 |
| 26 | a | 90 | ち | 43 | a | 88 | チ | 32 | a | 84 |

TABLE 2-A-continued

Character Mode Likelihood Table

| | Mode | | | | | | | | | |
|---|---|---|---|---|---|---|---|---|---|---|
| | Roman character to hiragana | | Kana to hiragana | | Roman character to katakana | | Kana to katakana | | English and numerals | |
| Key Code | Character Code | Evaluated value | Character Code | Evaluated value | Character Code | Evaluated value | Character Code | Evaluated value | Character Code | Evaluated value |
| 27 | s | 77 | と | 64 | s | 54 | ト | 33 | s | 77 |
| 28 | d | 57 | し | 71 | d | 68 | シ | 76 | d | 72 |
| 29 | f | 0 | は | 57 | f | 0 | ハ | 66 | f | 59 |
| 30 | g | 58 | き | 60 | g | 59 | キ | 61 | g | 54 |
| 31 | h | 62 | く | 63 | h | 49 | ク | 64 | h | 72 |
| 32 | j | 0 | ま | 51 | j | 0 | マ | 49 | j | 19 |
| 33 | k | 81 | の | 67 | k | 76 | ノ | 32 | k | 26 |
| 34 | l | 0 | り | 52 | l | 0 | リ | 54 | l | 68 |
| 35 | ; | 0 | れ | 46 | ; | 0 | レ | 61 | ; | 0 |
| 36 | , | 0 | け | 46 | , | 0 | ケ | 42 | , | 0 |
| 37 | ] | 0 | 」む | 21 | ] | 0 | ム | 30 | ] | 0 |
| 38 | z | 52 | つ | 52 | z | 44 | ツ | 21 | z | 47 |
| 39 | x | 0 | さ | 47 | x | 0 | サ | 44 | x | 13 |
| 40 | c | 0 | そ | 41 | c | 0 | ソ | 38 | c | 68 |
| 41 | v | 0 | ひ | 36 | v | 0 | ヒ | 71 | v | 42 |
| 42 | b | 41 | こ | 59 | b | 41 | コ | 79 | b | 50 |
| 43 | n | 89 | み | 31 | n | 95 | ミ | 21 | n | 82 |
| 44 | m | 61 | も | 48 | m | 54 | モ | 42 | m | 67 |
| 45 | ` | 63 | ね | 25 | ` | 40 | ネ | 33 | , | 0 |
| 46 | . | 51 | る | 58 | . | 37 | ル | 66 | . | 0 |
| 47 | / | 0 | め | 34 | / | 0 | メ | 26 | / | 0 |
| 48 | ★ | 0 | ろ | 29 | ★ | 0 | ロ | 41 | ★ | 0 |
| 49 | ! | 0 | ★ | 0 | ! | 0 | ★ | 0 | ! | 0 |
| 50 | " | 0 | ★ | 0 | " | 0 | ★ | 0 | " | 0 |
| 51 | # | 0 | あ | 0 | # | 0 | ア | 0 | # | 0 |
| 52 | $ | 0 | ラ | 0 | $ | 0 | ウ | 0 | $ | 0 |
| 53 | % | 0 | え | 0 | % | 0 | エ | 6 | % | 0 |
| 54 | & | 0 | お | 0 | & | 0 | オ | 0 | & | 0 |
| 55 | ' | 0 | や | 29 | ' | 0 | ヤ | 41 | ' | 0 |
| 56 | ( | 0 | ゆ | 48 | ( | 0 | ユ | 53 | ( | 0 |
| 57 | ) | 0 | よ | 59 | ) | 0 | ヨ | 59 | ) | 0 |
| 58 | ★ | 0 | を | 51 | ★ | 0 | ヲ | ★ | ★ | 0 |
| 59 | = | 0 | ★ | 0 | = | 0 | ★ | = | = | 0 |
| 60 | — | 0 | ★ | 0 | — | 0 | ★ | — | — | 0 |
| 61 | — | 0 | ★ | 0 | — | 89 | ★ | ~ | ~ | 0 |
| 62 | Q | 0 | ★ | 0 | Q | 0 | ★ | Q | Q | 0 |
| 63 | W | 0 | ★ | 0 | W | 0 | ★ | W | W | 50 |
| 64 | E | 0 | い | 0 | E | 0 | イ | E | E | 90 |
| 65 | R | 0 | ★ | 0 | R | 0 | ★ | R | R | 71 |
| 66 | T | 0 | ★ | 0 | T | 0 | ★ | T | T | 91 |
| 67 | Y | 0 | ★ | 0 | Y | 0 | ★ | Y | Y | 12 |
| 68 | U | 0 | ★ | 0 | U | 0 | ★ | U | U | 61 |
| 69 | I | 0 | ★ | 0 | I | 0 | ★ | I | I | 82 |
| 70 | O | 0 | ★ | 0 | O | 0 | ★ | O | O | 83 |
| 71 | P | 0 | ★ | 0 | P | 0 | ★ | P | P | 64 |
| 72 | ` | 0 | ★ | 0 | ` | 0 | ★ | ` | ` | 0 |
| 73 | { | 0 | 「 | 0 | { | 0 | 「 | { | { | 0 |
| 74 | A | 0 | ★ | 0 | A | 0 | ★ | A | A | 84 |
| 75 | S | 0 | ★ | 0 | S | 0 | ★ | S | S | 77 |
| 76 | D | 0 | ★ | 0 | D | 0 | ★ | D | D | 72 |
| 77 | F | 0 | ★ | 0 | F | 0 | ★ | F | F | 59 |
| 78 | G | 0 | ★ | 0 | G | 0 | ★ | G | G | 54 |
| 79 | H | 0 | ★ | 0 | H | 0 | ★ | H | H | 72 |
| 80 | J | 0 | ★ | 0 | J | 0 | ★ | J | J | 21 |
| 81 | K | 0 | ★ | 0 | K | 0 | ★ | K | K | 26 |
| 82 | L | 0 | ★ | 0 | L | 0 | ★ | L | L | 68 |
| 83 | + | 0 | ★ | 0 | + | 0 | ★ | + | + | 0 |
| 84 | * | 0 | ★ | 0 | * | 0 | ★ | * | * | 0 |
| 85 | } | 0 | 」 | 0 | } | 0 | 」 | } | } | 0 |
| 86 | Z | 0 | っ | 49 | Z | 0 | ッ | Z | Z | 47 |
| 87 | X | 0 | ★ | 0 | X | 0 | ★ | X | X | 13 |
| 88 | C | 0 | ★ | 0 | C | 0 | ★ | C | C | 68 |
| 89 | V | 0 | ★ | 0 | V | 0 | ★ | V | V | 42 |
| 90 | B | 0 | ★ | 0 | B | 0 | ★ | B | B | 50 |
| 91 | N | 0 | ★ | 0 | N | 0 | ★ | N | N | 82 |
| 92 | M | 0 | ★ | 0 | M | 0 | ★ | M | M | 67 |
| 93 | < | 0 | 、 | 63 | < | 0 | 、 | < | < | 0 |

TABLE 2-A-continued

Character Mode Likelihood Table

| | Mode | | | | | | | | |
|---|---|---|---|---|---|---|---|---|---|
| | Roman character to hiragana | | Kana to hiragana | | Roman character to katakana | | Kana to katakana | | English and numerals | |
| Key Code | Character Code | Evaluated value | Character Code | Evaluated value | Character Code | Evaluated value | Character Code | Evaluated value | Character Code | Evaluated value |
| 94 | > | 0 | . | 51 | > | 0 | . | > | 0 | |
| 95 | ? | 0 | . | 0 | ? | 0 | . | ? | 0 | |
| 96 | — | 0 | ★ | 0 | — | 0 | ★ | — | 0 | |

Note:
The '★' represents no character assignment.

TABLE 2-B

Character Mode Likelihood Table

| | Mode | | | | | |
|---|---|---|---|---|---|---|
| | Roman character to hiragana | | Kana to hiragana | | English and numerals | |
| Key Code | Character | Evaluated value | Character | Evaluated value | Character | Evaluated value |
| 01 | 1 | 35 | ぬ | 0 | 1 | 35 |
| 02 | 2 | 35 | ふ | 29 | 2 | 35 |
| 03 | 3 | 35 | あ | 49 | 3 | 35 |
| 04 | 4 | 35 | ヲ | 78 | 4 | 35 |
| 05 | 5 | 35 | え | 36 | 5 | 35 |
| 06 | 6 | 35 | お | 46 | 6 | 35 |
| 07 | 7 | 35 | や | 28 | 7 | 35 |
| 08 | 8 | 35 | ゆ | 14 | 8 | 35 |
| 09 | 9 | 35 | よ | 43 | 9 | 35 |
| 10 | 0 | 35 | わ | 32 | 0 | 35 |
| 11 | - | 0 | ほ | 33 | - | 0 |
| 12 | ^ | 0 | へ | 14 | ^ | 0 |
| 13 | \ | 36 | ー | 36 | ¥ | 0 |
| 14 | q | 0 | た | 60 | q | 0 |
| 15 | w | 47 | て | 58 | w | 50 |
| 16 | e | 78 | い | 80 | e | 91 |
| 17 | r | 69 | す | 54 | r | 81 |
| 18 | t | 79 | か | 66 | t | 86 |
| 19 | y | 65 | ん | 75 | y | 56 |
| 20 | u | 88 | な | 54 | u | 61 |
| 21 | i | 89 | に | 60 | i | 80 |
| 22 | o | 90 | ら | 45 | o | 82 |
| 23 | p | 25 | せ | 48 | p | 63 |
| 24 | @ | −52 | ゛ | 0 | @ | −52 |
| 25 | [ | 10 | ゜ | 0 | [ | 0 |
| 26 | a | 90 | ち | 43 | a | 84 |
| 27 | s | 77 | と | 64 | s | 77 |
| 28 | d | 57 | し | 71 | d | 72 |
| 29 | f | 0 | は | 57 | f | 59 |
| 30 | g | 58 | き | 60 | g | 54 |
| 31 | h | 62 | く | 63 | h | 72 |
| 32 | j | 0 | ま | 51 | j | 21 |
| 33 | k | 81 | の | 67 | k | 26 |
| 34 | l | 0 | り | 52 | l | 68 |
| 35 | ; | 0 | れ | 46 | ; | 0 |
| 36 | ' | 0 | け | 46 | : | 0 |
| 37 | ] | 10 | む | 21 | ] | 0 |
| 38 | z | 52 | つ | 52 | z | 47 |
| 39 | x | 0 | さ | 47 | x | 13 |
| 40 | c | 21 | そ | 41 | c | 68 |
| 41 | v | 0 | ひ | 36 | v | 42 |
| 42 | b | 41 | こ | 59 | b | 50 |
| 43 | n | 89 | み | 31 | n | 81 |
| 44 | m | 61 | も | 48 | m | 67 |
| 45 | , | 63 | ね | 25 | , | 0 |
| 46 | . | 51 | る | 58 | . | 0 |

TABLE 2-B-continued

Character Mode Likelihood Table

| | Mode | | | | | |
|---|---|---|---|---|---|---|
| | Roman character to hiragana | | Kana to hiragana | | English and numerals | |
| Key Code | Character | Evaluated value | Character | Evaluated value | Character | Evaluated value |
|---|---|---|---|---|---|---|
| 47 | / | 0 | め | 34 | / | 0 |
| 48 | ★ | 0 | ろ | 29 | ★ | 0 |
| 49 | ! | 0 | ★ | 0 | ! | 0 |
| 50 | " | 0 | ★ | 0 | " | 0 |
| 51 | # | 0 | あ | 0 | # | 0 |
| 52 | $ | 0 | ラ | 0 | $ | 0 |
| 53 | % | 0 | え | 0 | % | 0 |
| 54 | & | 0 | お | 0 | & | 0 |
| 55 | ' | 0 | や | 29 | ' | 0 |
| 56 | ( | 0 | ゆ | 48 | ( | 0 |
| 57 | ) | 0 | よ | 59 | ) | 0 |
| 58 | ★ | 0 | ・ | 51 | ★ | 0 |
| 59 | = | 0 | ★ | 0 | = | 0 |
| 60 | — | 0 | ★ | 0 | — | 0 |
| 61 | ━ | 36 | ★ | 0 | | | 0 |
| 62 | Q | 0 | ★ | 0 | Q | 0 |
| 63 | W | 0 | ★ | 0 | W | 50 |
| 64 | E | 0 | い | 0 | E | 91 |
| 65 | R | 0 | ★ | 0 | R | 81 |
| 66 | T | 0 | ★ | 0 | T | 86 |
| 67 | Y | 0 | ★ | 0 | Y | 56 |
| 68 | U | 0 | ★ | 0 | U | 61 |
| 69 | I | 0 | ★ | 0 | I | 80 |
| 70 | O | 0 | ★ | 0 | O | 82 |
| 71 | P | 0 | ★ | 0 | P | 63 |
| 72 | ` | 0 | ★ | 0 | ` | 0 |
| 73 | { | 0 | г | 10 | { | 0 |
| 74 | A | 0 | ★ | 0 | A | 84 |
| 75 | S | 0 | ★ | 0 | S | 77 |
| 76 | D | 0 | ★ | 0 | D | 72 |
| 77 | F | 0 | ★ | 0 | F | 59 |
| 78 | G | 0 | ★ | 0 | G | 54 |
| 79 | H | 0 | ★ | 0 | H | 72 |
| 80 | J | 0 | ★ | 0 | J | 21 |
| 81 | K | 0 | ★ | 0 | K | 26 |
| 82 | L | 0 | ★ | 0 | L | 68 |
| 83 | + | 0 | ★ | 0 | + | 0 |
| 84 | * | 0 | ★ | 0 | * | 0 |
| 85 | } | 0 | 」 | 10 | } | 0 |
| 86 | Z | 0 | つ | 49 | Z | 47 |
| 87 | X | 0 | ★ | 0 | X | 13 |
| 88 | C | 0 | ★ | 0 | C | 68 |
| 89 | V | 0 | ★ | 0 | V | 42 |
| 90 | B | 0 | ★ | 0 | B | 50 |
| 91 | N | 0 | ★ | 0 | N | 81 |
| 92 | M | 0 | ★ | 0 | M | 67 |
| 93 | < | 0 | 、 | 63 | < | 0 |
| 94 | > | 0 | 。 | 51 | > | 0 |
| 95 | ? | 0 | ・ | 16 | ? | 0 |
| 96 | — | 0 | ★ | 0 | — | 0 |

Note:
The '★' represents no character assignment.

Tables 2-A and 2-B show different typical character mode likelihood tables for use with the present invention. The tables are constituted by the likelihood values, in each character mode, of the key codes representing the keys shown in FIG. 3, and by the character codes paired with these key codes. The key codes are the values assigned to each of the character keys on the keyboard of FIG. 3. For example, the key 321 corresponds to a key code 01, the key 322 to a key code 02, and the key 323 to a key code 03. The key codes 01 through 48 correspond to 48 keys extending from the top left key to the bottom right key excluding the space key. Pushing the shift key 313 or 314 simultaneously with a character key inputs one of the key codes 49 through 96, which correspond to the character keys in the same manner as above. Referring to the box where a key code and a character mode intersect provides the likelihood value of the corresponding character code in that character mode. With this embodiment, the boxes in the likelihood column contain values that may be directly added, i.e., values computed illustratively by use of the following formula:

$$R \log Pa \qquad (2)$$

The character mode likelihood table for use with this embodiment is constructed to double as a character code conversion table. For example, suppose that the alphanumeric character mode is currently in effect and that the key 323 is depressed. In that case, a reference to the character code in the box where the key code 03 and the alphanumeric character mode intersect provides conversion to a character code 3. If the key 323 is pressed simultaneously with the shift key, referring to the box where the key code 51 and the alphanumeric character mode intersect effects conversion to a character code #. Furthermore, a key code may be obtained in reverse from a character mode and a character code. The space key has no shift code that applies thereto and has a likelihood value that is common to all modes. When the space key is operated, the key code thereof is converted directly to the character code representing a space. The key code of the space key is set to 00.

Figure 7:
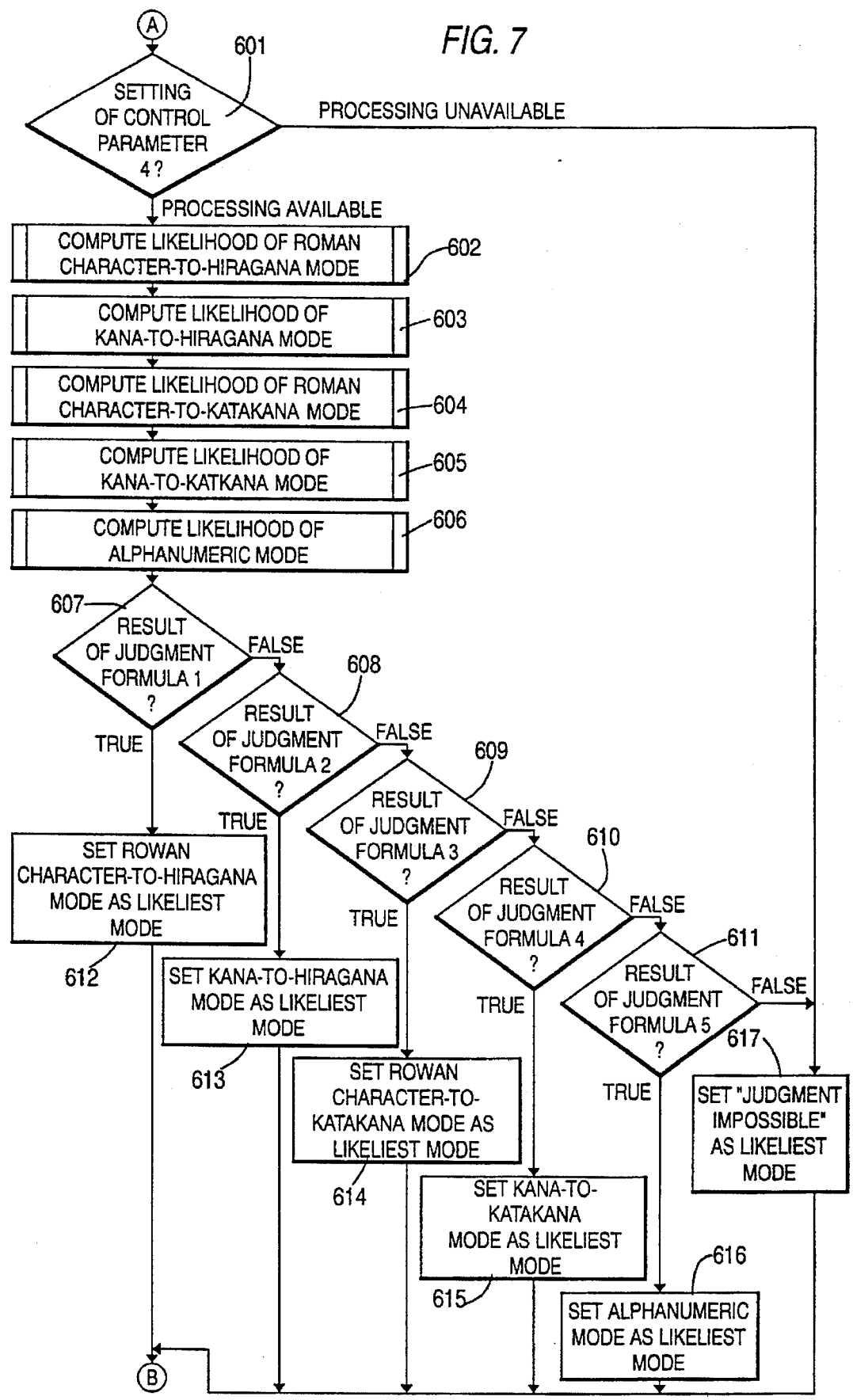
FIG. 7 is a flowchart of the steps for determining the likeliest character mode.
Figure 12A:
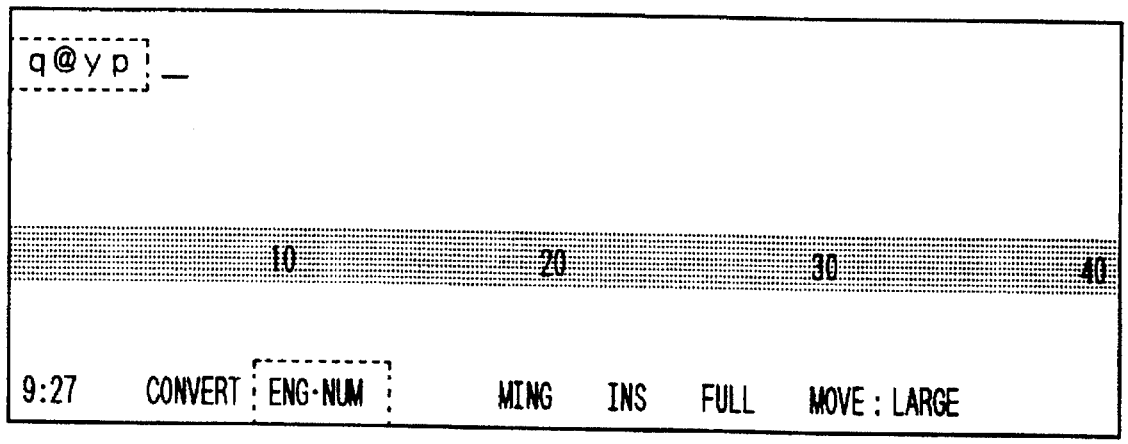
FIGS. 12(A) and 12(B) show other screen display examples in accordance with the present invention.

Referring now to FIG. 7, there is shown a flow chart for the character mode likelihood judgment processing. Suppose that the alphanumeric character mode is currently established and that the key codes 14, 24, 19 and 23 are input. In that case, the character code string "q@yp" is held in the character buffer 410. The screen displays what is shown in FIG. 12(A).

Figure 12B:
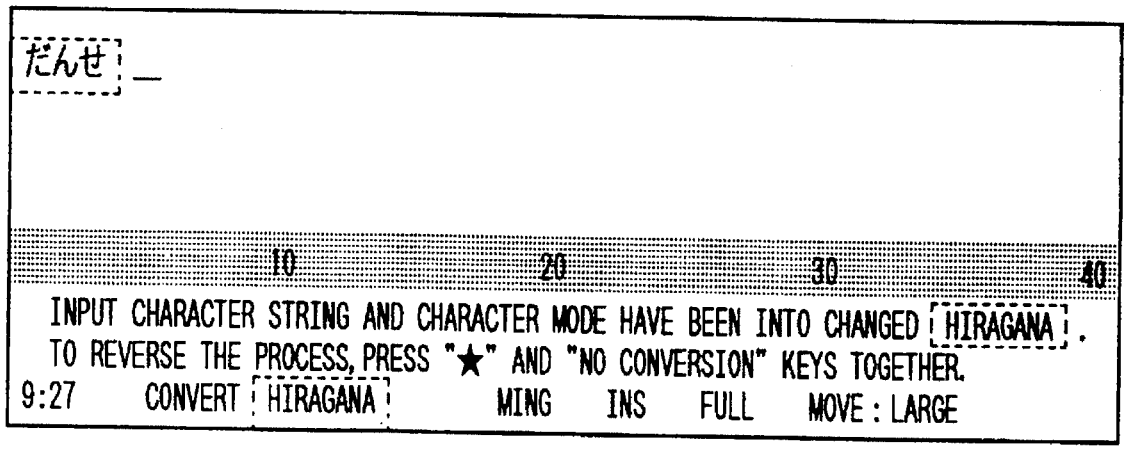

In step 601 of FIG. 7, a control parameter 4 is referenced. With its setting varied as designated, the control parameter 4 switches character inputting methods. Details of this parameter will be described later. If the control parameter 4 is found to contain a value designating the availability of processing, step 602 is reached. Step 602 computes the likelihood Vrh in effect when the key codes held in the key code buffer 405 are regarded as applicable to the Roman character-to-hiragana mode. The computation involves adding the likelihood values of the characters in question in the character mode likelihood table. If a key code of 16, in accordance with Table 2-A, is entered anew from the keyboard in the above example, the key code string held in the key code buffer 405 becomes: 14, 24, 19, 23, 16. This means that Vrh=0+0+65+25+78=168. Likewise, step 603 computes the likelihood Vkh in effect when the key codes held in the key code buffer 405 are regarded as applicable to the kana-to-hiragana mode; step 604 computes the likelihood Vrk in effect when the key codes in question are regarded as applicable to the Roman character-to-katakana mode; step 605 computes the likelihood Vkk in effect when the key codes are regarded as applicable to the kana-to-katakana mode; and step 606 computes the likelihood Ve in effect when the key codes are regarded as applicable to the alphanumeric mode. In the above example, the results of the computed likelihood for the different character modes are: Vkh=328, Vrk=173, Vkk=294, and Ve=166. Then the likeliest mode is judged in steps 607, 608, 609, 610 and 611. The judgment above is made by use of the judgment formulas given below.

$$Vrh > max(Vrk, Vkh, Vkk, Ve) + T \text{ judgment formula 1}$$

$$Vkh > max(Vrh, Vrk, Vkk, Ve) + T \text{ judgment formula 2}$$

$$Vrk > max(Vrh, Vkh, Vkk, Ve) + T \text{ judgment formula 3}$$

$$Vkk > max(Vrh, Vrk, Vkh, Ve) + T \text{ judgment formula 4}$$

$$Ve > max(Vrh, Vkk, Vkh, Vkk) + T \text{ judgment formula 5} \quad (3)$$

where, T is a control parameter representing a constant threshold value. The control unit 401 sets an appropriate threshold value and places it in the control parameter storing register 408. When one of the judgment formulas 1 through 5 is found to be true, step 612, 613, 614, 615 or 616 is reached, respectively. The step reached establishes the value representing the likeliest character mode. If all judgment formulas turn out to be false, or if the control parameter 4 contains a value designating the unavailability of processing, a "judgment-unavailable" value is set as the likeliest mode in step 617. If T=30, then judgment formula 2 becomes true. This causes step 613 to be reached. Step 613 sets the kana-to-hiragana mode as the likeliest mode. This completes the character mode likelihood judgment processing, which is followed by step 106 of FIG. 5. Step 106 compares the current character mode with the mode found to be the likeliest in the preceding processing. If the current character mode is the alphanumeric mode (i.e., likeliest mode being different from the current character mode), step 107 is reached for alarm generation processing as will be described with reference to FIG. 8. In step 701, a control parameter 2 is referenced. The control parameter 2 (to be described later) is a parameter that controls the way in which an alarm is generated. Here, the control parameter 2 is assumed to contain a value "1". Step 701 is followed by step 702. Step 702 references the character code column in the character mode likelihood table in accordance with the key codes in the key code buffer 405 as well as with the likeliest mode previously established, and replaces accordingly the already input character string in the character buffer 410. In step 703, the current character mode is replaced in value by the likeliest mode. In step 704, a message 1 shown in FIG. 10(A) is displayed to inform the user that the character string and the character mode have been changed and that there is a way to reverse the process. Finally in step 705, the key code buffer 405 is cleared to make way for judging the character mode likelihood of the next input key code string. In the above example, the key code string "q@yp" is converted to a Japanese phrase "かんせ" and the character mode is changed from the alphanumeric mode to the kana-to-hiragana mode. The screen in effect at this point is shown in FIG. 12(B).

It may happen that with the Roman character mode being the likeliest mode, the result of character code conversion remains incomplete halfway through the corresponding Romanized spelling. In that case, some prior art character inputting methods fail to display the Roman characters halfway through conversion, or display the incomplete Romanized spelling in the guidance area. By contrast, a variation of the method according to the present invention puts alarm generation on hold until the Roman characters halfway through conversion are fully converted to the corresponding kana phrase. This prevents the user from making a key input error in reaction to premature alarm generation.

Figure 8:
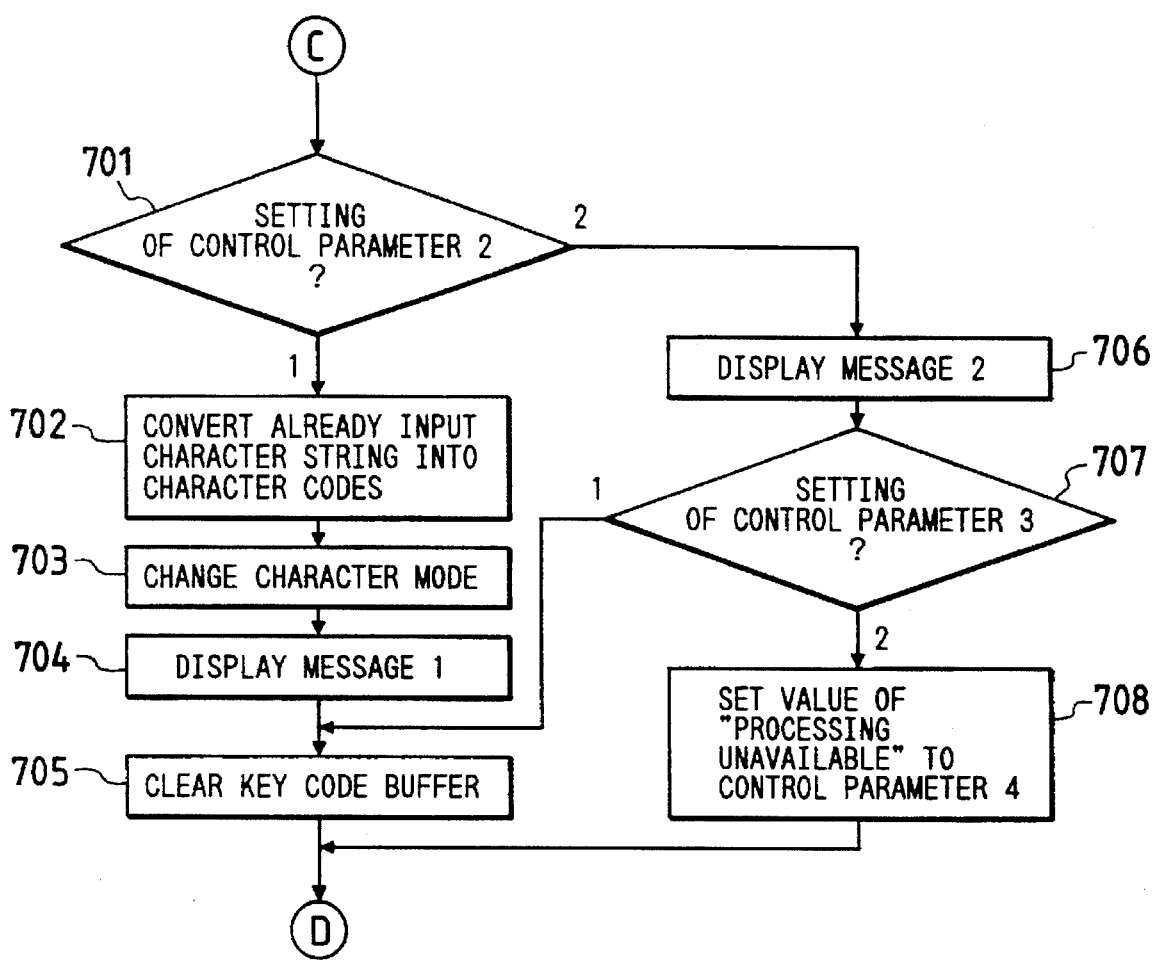
FIG. 8 is a flowchart of the steps for alarm output processing.

Suppose that the control parameter 2 is found to be set to "2" in step 701 of FIG. 8. In that case, neither the already input character string is replaced, nor the character mode is changed. In step 706, the message 2 of FIG. 10(B) is displayed. The user is asked to confirm if the character mode is correct, and is guided as to how to change the character mode of the input character string where necessary. In step 707, a control parameter 3 is referenced. The control parameter 3 is a parameter that controls the way in which to input characters. If the control parameter 3 is found to contain "1", step 705 is reached for another character mode likelihood judgment processing. Step 705 clears the key code buffer 405 as described above. If the control parameter 3 is found to contain "2" in step 707, a character inputting method comes into effect whereby the character mode likelihood judgment processing is suppressed until the current character mode designation is changed. In step 708, the value designating the unavailability of processing is set to the control parameter 4. This inhibits the output of distracting messages so that the user may keep on inputting characters in the current character mode.

Figure 5:
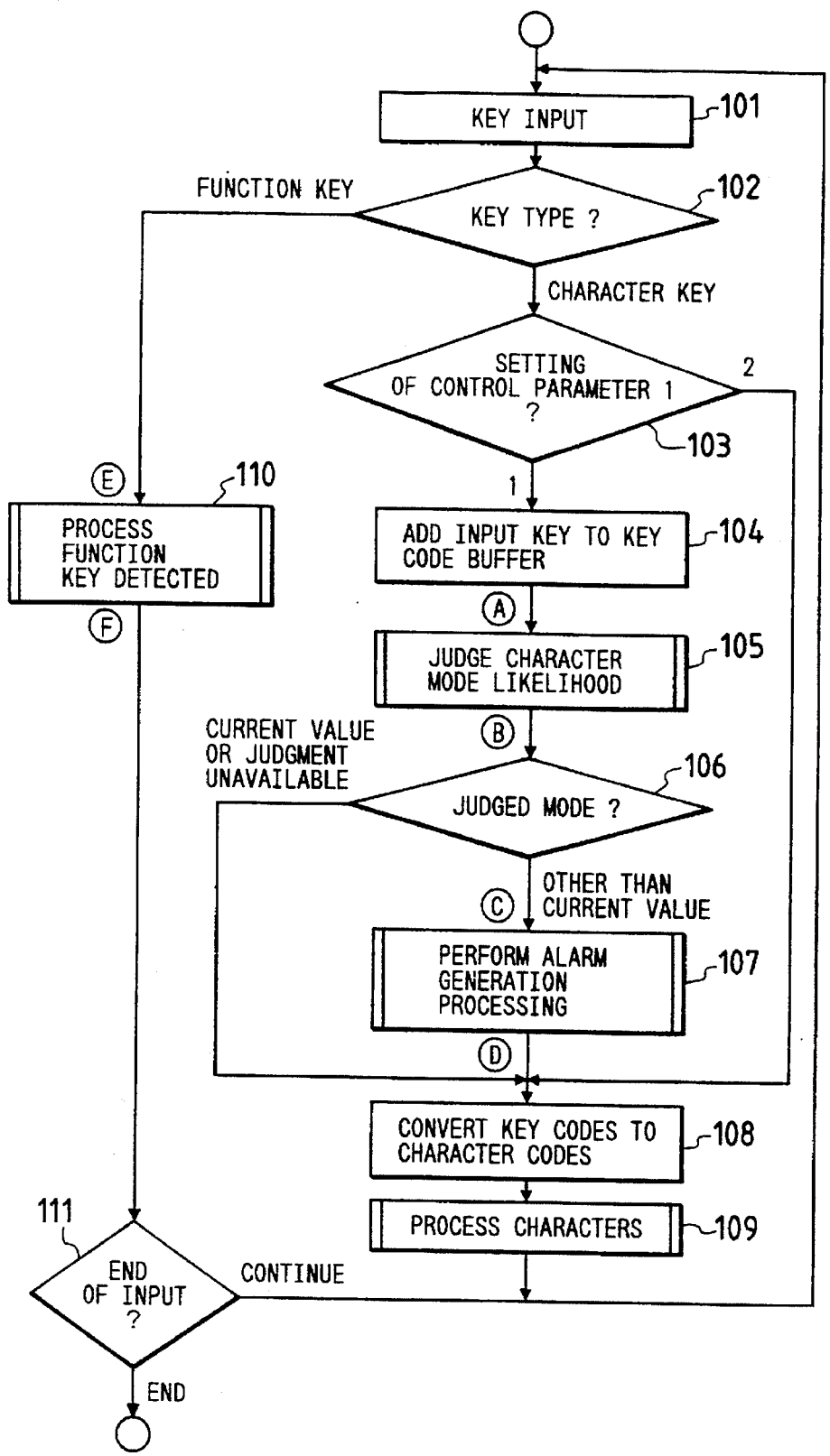
FIG. 5 is a flowchart depicting the operation of the method of the present invention.

This completes the alarm generation processing, which is followed by step 108 of FIG. 5. In step 108, a newly input character key is processed. In the above example, the key code entered anew is 16 and the character mode is changed for the kana-to-hiragana mode. Thus the character code "い" is added to the character buffer 410 and the corresponding screen appears on the display unit.

Thereafter, step 101 is reached again. The subsequent steps are repeated until the end of character input is designated by operation of function keys.

Figure 9:
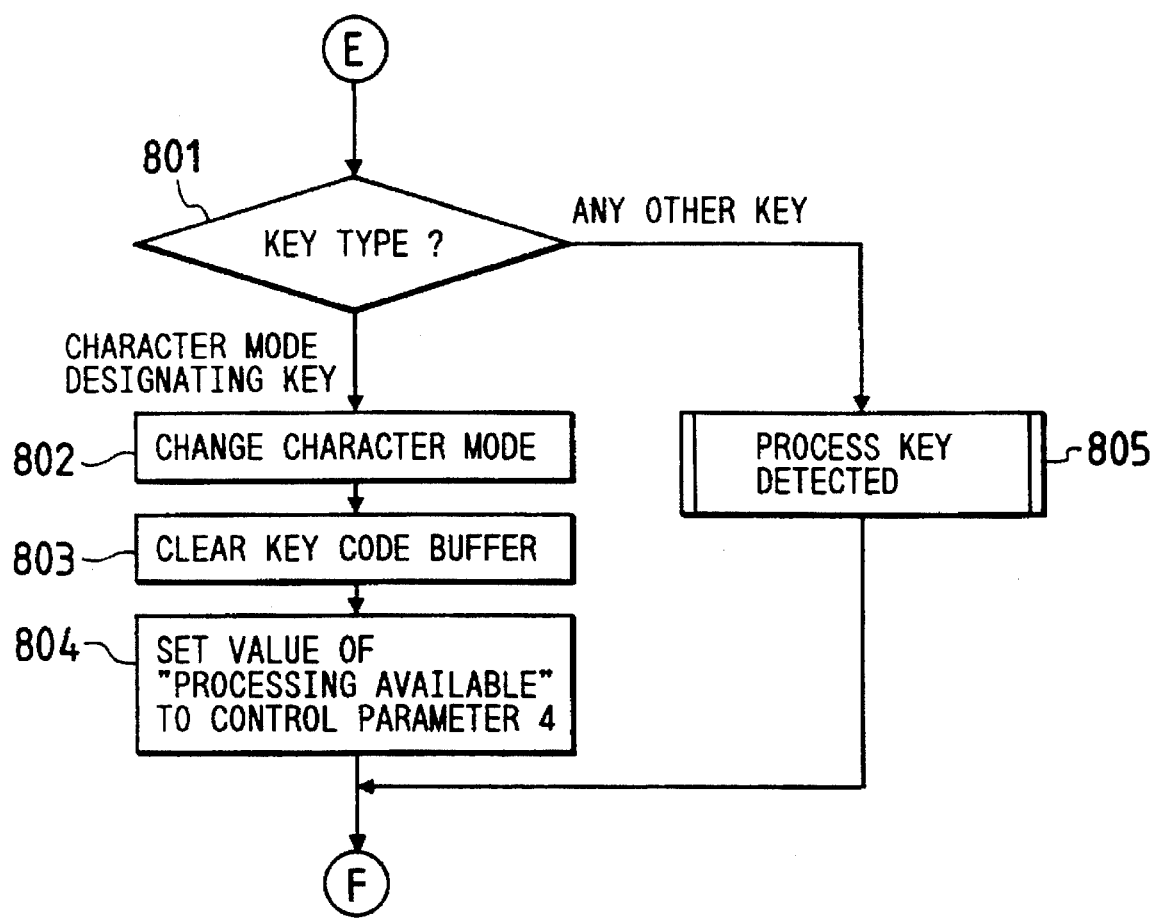
FIG. 9 is a flowchart of the steps for processing character mode designating keys.

For the processing performed when a character mode designating key is operated, it is assumed that a character mode designating key is pressed in step 101 of FIG. 5. In that case, step 101 is followed by step 102 and 110, in that order. The details of step 110 are depicted in FIG. 9 wherein in step 801, a check is made to see if the key is a character mode designating key. If the key is something other than a character mode designating key, step 805 is reached for appropriate processing regarding the key detected. Description of this processing is omitted here. If a character mode designating key is detected in step 801, step 802 is reached in which the character mode is changed as described above. For example, with the alphanumeric mode in effect, pressing the katakana mode designating key 309 establishes the katakana mode as the new character mode. In step 803, the key code buffer 405 is cleared. With the key code buffer 405 cleared, the likelihood of the new character mode to be obtained will not be affected by inadvertent use of the remaining old key code data. Finally in step 804, the control parameter 4 is set to the value designating the availability of processing. This resumes the character mode likelihood judgment processing that was suppressed when the control parameter 3 was found to contain "2".

The control parameters will now be described in detail. The control parameter 1, set by the user operating function keys, determines whether or not to utilize the character inputting method according to the invention. If the control parameter 1 is set to "1", the inventive character inputting method is employed; if the parameter is set to "2", the method embodying the invention is not used.

The control parameter 2 is used to select one of variations of the inventive character inputting method. If the control parameter 2 is set to "1", messages are displayed upon alarm generation; the already entered character string is converted to character codes; and character modes are changed as needed. If the control parameter 2 is set to "2", only messages are displayed. As with the control parameter 1, the control parameter 2 is set by the user. The control parameter 2 may also be set by the control unit 401 in accordance with the number of key codes in the key code buffer 405.

For example, suppose that "1" is set to the control parameter 2 for a key code count of fewer than 10, and "2" for a key code count of 10 or more. These settings result in that both conversion of the already input character string into character codes and character mode changeover are provided upon alarm generation with fewer than 10 input key codes; and that where 10 or more key codes are input, only message display is available. This is a reasonable method to follow in view of the fact that until the number of key inputs exceeds a certain count, the user most often confirms both the character mode and the already input character string visually on the screen.

The control unit 401 may vary the setting of the control parameter 2 depending on the threshold value T mentioned above. Where the threshold value T is relatively small, the control parameter 2 is set to "2" to provide message display alone, since the likelihood of the judged mode is low. Where the threshold value T is relatively large, the control parameter 2 is set to "1" to provide both conversion of the already input character string into character codes and character mode changeover, since the user-designated character mode is highly likely to be erroneous. This is another feature that highlights the usefulness of the invention. Furthermore, the key code count and the threshold value T may be controlled in combination. For example, up to a predetermined key code count N, a large value T1 may be set as the threshold value T and the value "1" placed in the control parameter 2; where the key code count N is reached, a small value T2 may be set as the threshold value T and the value "2" placed in the control parameter 2. This makes it possible to provide, with high levels of likelihood up to the key code count N, both conversion of the already input character string into character codes and character mode conversion. Beyond the key code count N, message display is effected for even a small discrepancy between the likelihood values detected.

It may happen that where the control parameter 2 is set to "2", the user continues key input without changing character mode designation following a message display. In such a case, the control parameter 3 is used to determine whether or not to carry out character mode likelihood judgment processing for the continued key input. When the control parameter 3 is set to "1", a character mode likelihood judgment is made anew on the continued key input. This feature is useful where the user is likely to make frequent character mode designation errors. When the control parameter 3 is set to "2", the character mode likelihood judgment is inhibited until character modes are changed by operation of character mode designating keys. What takes place illustratively with the control parameter 3 in use is shown in FIGS. 16(A) and 16(B). This feature is useful as it prevents erroneous judgments from distracting the experienced user who is skilled in character input and who makes few character mode designation errors. As with the control parameter 1, the control parameter 3 is set by the user.

The control parameter 4 is used to determine whether or not to make a character mode likelihood judgment following the entry of key codes into the key code buffer 405. The control unit 401 may change the parameter setting in accordance with the key code count. For example, the control parameter 4 may be set to specify that the judgment is to be unavailable until the key code count N (i.e., number of input characters) is reached. Conversely, the control parameter 4 may be set to specify the judgment is to be unavailable after the key code count N is reached.

Another parameter may be alternatively used to effect character mode changeover alone or only the conversion of the already input character string into character codes. Although details are omitted herein, such a character inputting method is readily implemented by inserting decision steps between steps 702 and 703 and between steps 703 and 704 in FIG. 8.

The method and apparatus according to the invention may also be used in combination with a Japanese kana-to-kanji converting apparatus. If the so-called sequential conversion is adopted by the kana-to-kanji converting method in such a setup, the character mode changeover according to the invention and the kana-to-kanji conversion may occur simultaneously. Such occurrences, with sequential conversion in effect, may be dealt with by setting the control parameter 2 to "2". Arrangements may be made so that the user will have a choice as to whether or not to resort to this parameter setting.

Figure 13A:
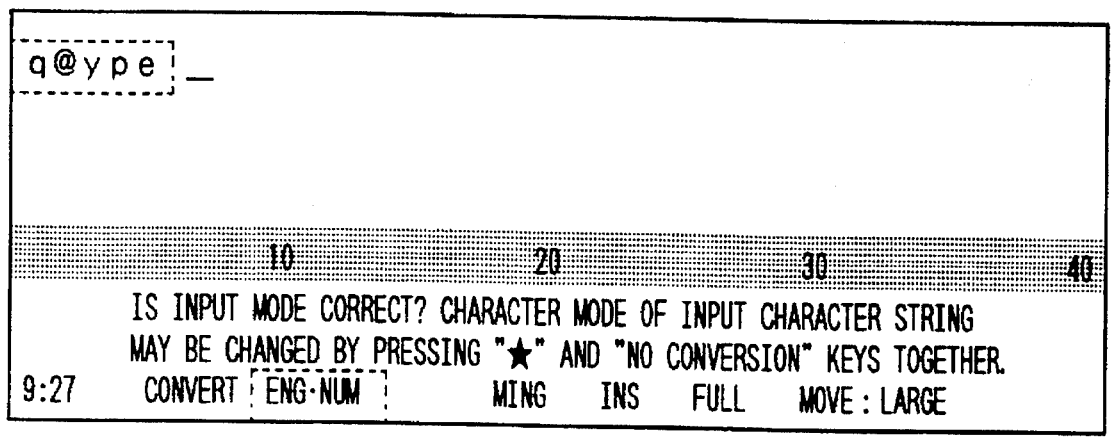
FIGS. 13(A)–13(C) show further screen display examples in accordance with the present invention.
Figure 13B:
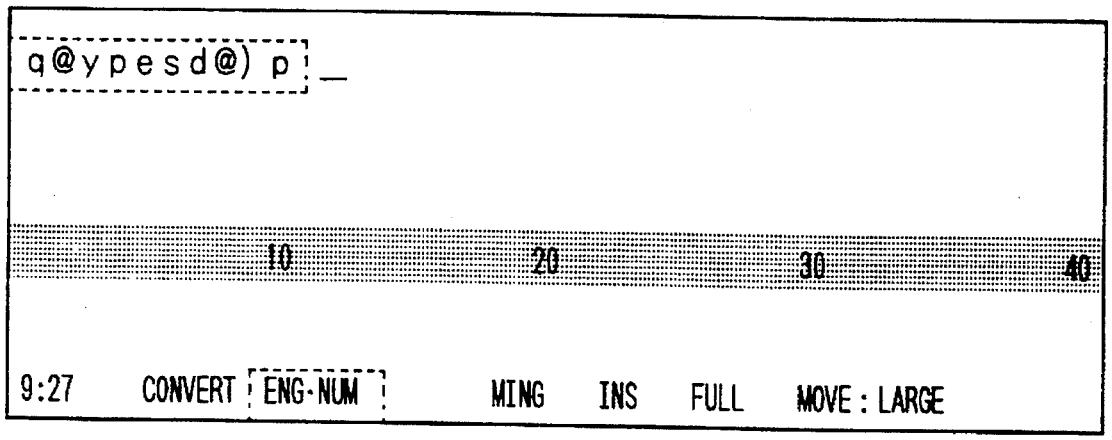
Figure 13C:
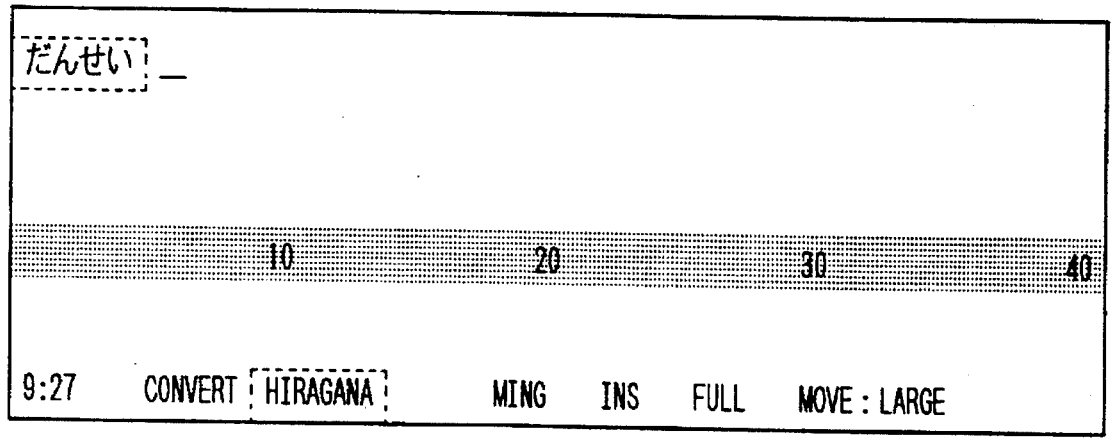

An alternative character inputting apparatus embodying the invention operates, for example, in the following manner. Where the user designates character code conversion as described, the apparatus converts the target character string (e.g., the character string preceding the cursor) back to the key code string. Using its character mode likelihood judging device, the apparatus determines the likeliest character mode and converts the character codes according to that mode. Where the user changes character codes repeatedly, the apparatus converts the character codes consecutively in different character modes. If its alarm generating means detects a character mode error, the apparatus asks the user to verify the character mode and outputs a message indicating available character code conversion. This allows the user to find and correct the error with ease. When the user, given the status as shown in the screen of FIG. 13(A), presses the keys 310 and 308 simultaneously to designate character code conversion, this results in the screen of FIG. 13(C).

The designation of character code conversion is also used where, with the parameter 1 set to "1", the changed character string and input mode are to be converted back to what they replaced earlier. When the user, given the status of the screen of FIG. 12(B), presses the keys 310 and 208 simultaneously, the initial status of FIG. 12(A) is restored. This measure is employed so as to avoid the possibility that the likelihood judgment may result in an error depending on the input of special keys. Illustratively, when character modes are switched in step 703, the old character mode is retained even as the new character mode is put into effect. The old character mode is set aside as the target mode to return to upon first designation of character mode conversion. This setup allows the old character mode to be restored whenever character code conversion is designated once. That is, when the message 1 of FIG. 10(A) is displayed in response to the initial designation of character code conversion, the old mode is restored; when the message 2 of FIG. 10(B) is displayed on like occasion, the likeliest character mode is put into effect, as described. Where character code conversion is designated consecutively, one of different character modes is alternately selected in the manner discussed earlier.

As described, the character inputting apparatus according to the invention relieves the user of such chores as operating particular keys for conversion to desired character codes or looking up and carrying out specific steps to designate character code conversion. The apparatus also reduces significantly the number of times the user operates the keys for designating character code conversion.

Although the above embodiments have been described in conjunction with a keyboard having character mode designating keys, another keyboard without those keys may be used alternatively. That is, with the likeliest character mode selected by the described method and apparatus based on the keys typed, these character mode designating keys become redundant.

Although a Japanese language keyboard is used with the above-described embodiments, this type of keyboard is in no way limitative of the present invention. That is, the present invention applies to many other character inputting apparatuses for inputting diverse combinations of characters and languages: e.g., English and Russian, English and Chinese, Greek and Chinese, and so on. For example, there may be used in connection with the invention a multilingual keyboard that permits entry of German, French and English words and sentences. While the basic alphabet is common to the three languages, a few characters are specific to German (e.g., umlaut and special character "ß") and to French (character with acute accent symbol, etc.). These special symbols and characters for German and French may be assigned the same keys, which may also stand for special symbols for use in English. Given this type of multilingual keyboard, three modes (German, French and English) may be provided and one of them may be activated at any one time for selective language input. Then the value of how likely each of the keys is operated in English, French and German is calculated, and the results are set in the character mode likelihood table. With these settings in place, the invention prevents, for example, a character unique to German, from appearing in French spellings or a special symbol specific to English from slipping into German words. Needless to say, Japanese may also be added to the above language mix if it is possible additionally to assign Japanese characters to the keys. What the present invention offers remains the same in terms of distinguishing language-specific symbols and characters among the languages.

Although the above embodiments output messages on a display unit, this is not intended to be limitative of the invention. The invention may utilize many other forms of message output such as those of voice and print output.

Figure 14:
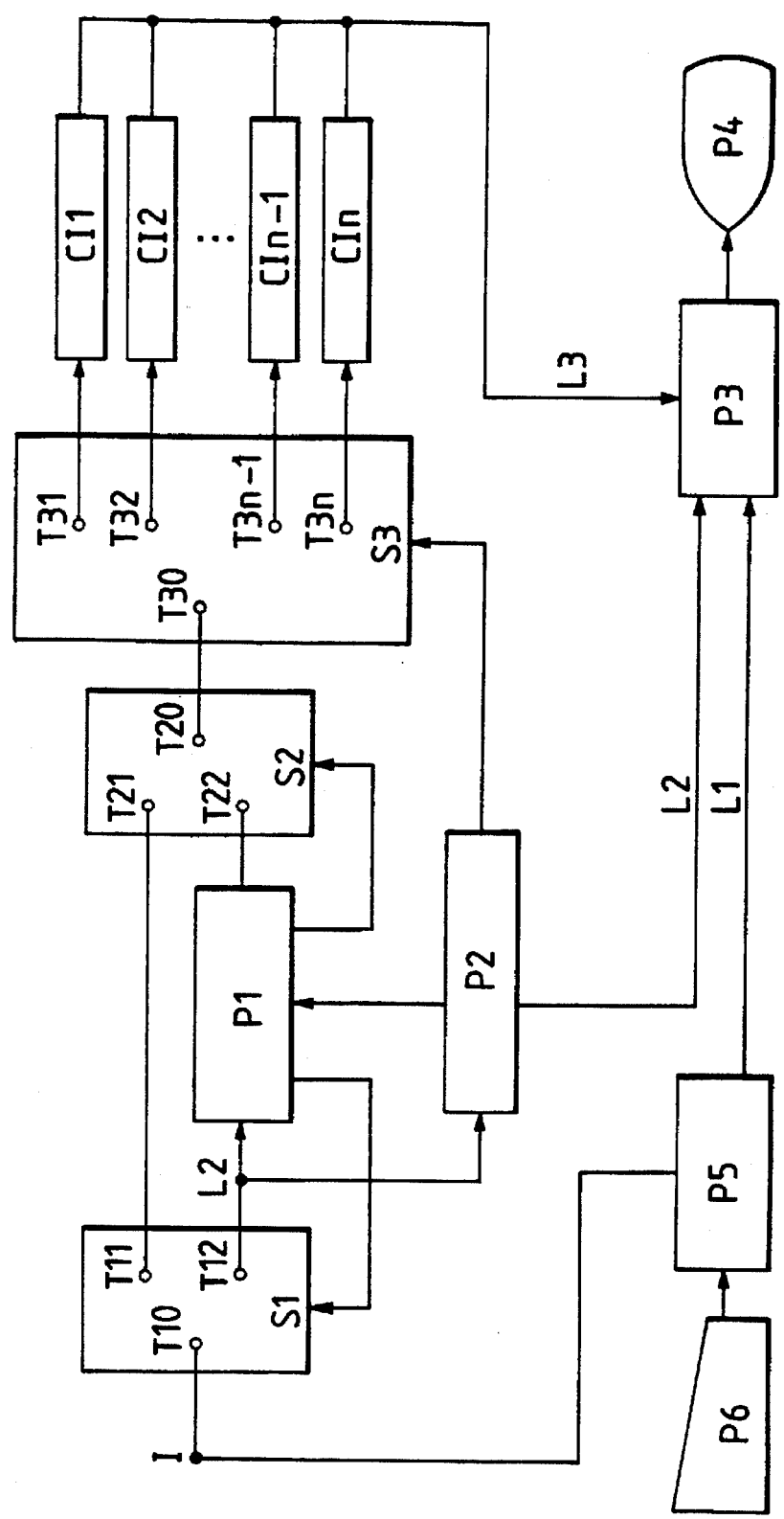
FIG. 14 is a block diagram of another embodiment of the present invention.

An embodiment incorporating the method and apparatus of the present invention for inputting characters whereby input character strings are judged for the likelihood of each of different language types is now described where the signals representing characters will be referred to as codes for distinguishing from the control signals, and the signal storing device will be referred to as a code storing device. FIG. 14 is a block diagram of this embodiment wherein P1 is the code storing device for storing sequentially the codes that are input through an input terminal I. In storing the codes, the code storing device controls the number of the input codes. P2 is the likelihood judging device for receiving simultaneously the codes stored in the code storing device P1 and judges the likeliest language type for the codes received. The code storing device P1 and the likelihood judging device P2 are capable of outputting control instructions to other devices in accordance with the internal status currently in effect. S1, S2 and S3 are switches for controlling the flow of codes that are input from the input terminal I. The switch S1 has terminals T10, T11 and T12; the switch S2 has terminals T20, T21 and T22; and the switch S3 likewise has terminals T30, T31, T32, ..., T3n–1 and T3n. The switches S1 and S2 connect and disconnect terminals under the direction of the code storing device P1. The switch S3 connects and disconnects terminals under the direction of the likelihood judging device P2. CI1, CI2, ..., CIn–1 and CIn are translating devices for translating the codes that are input from the input terminal I. (The translating devices CI1 through CIn are collectively referred to as CI). P3 is display controlling device for controlling the display of output information from the translating devices CI and from other devices. P4 is a display device for displaying to the user the input information from the display controller device P3. P6 is input device through which the user inputs desired characters. P5 is an input controller for generating predetermined codes illustratively in response to key input operations. In this arrangement, the input terminal I accepts the output information from the input controller P5. All the devices and the switches receive reset signals, not shown, which cause them to be reset to their respective initial states.

The display device P4 may be an electronic display device such as a CRT or LCD, or a plotter printer. The input device P6 may be a keyboard, a touch panel, a handwriting recognition device or a voice recognition device. Any apparatus capable of distinguishing user-input characters and outputting the codes representing these characters may be used as the input device P6. The code storing device P1, likelihood judging device P2, display controller P3, input controller P4, translating devices CI, and switches S1, S2 and S3 may be constituted either by hardware electronic circuits or by software arrangements that function under a CPU or like controller.

The display controller P3 receive output information from the input controller P5, likelihood judging device P2 and translating devices CI through signal lines L1, L2 and L3, respectively. Based on the information received, the display controller P3 computes the appropriate positions of relevant items and the contents thereof for display on the display device P4. The computed results are output to the display device P4.

Figure 17:
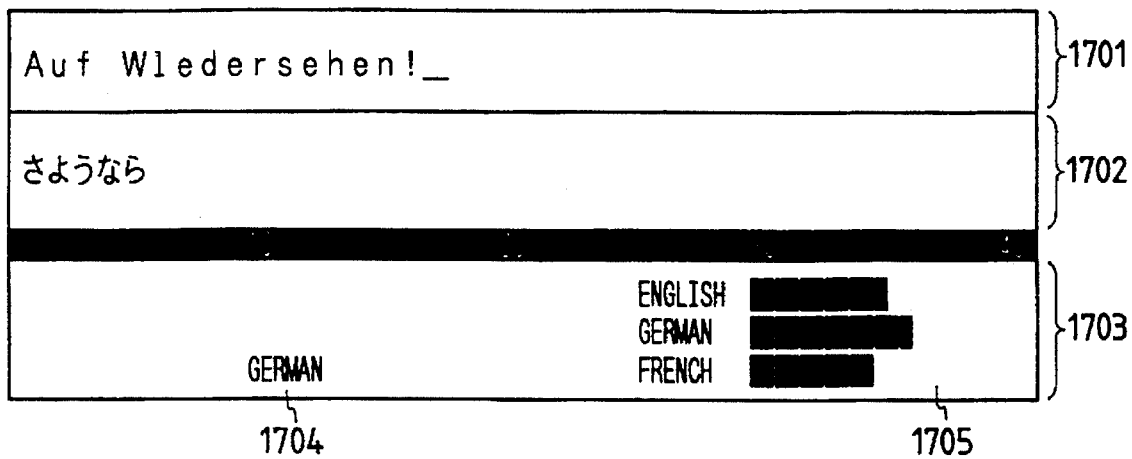
FIG. 17 shows a screen display example in accordance with FIG. 14.

FIG. 17 is a view showing a typical screen of the display device P4 wherein reference numeral 1701 is an area for displaying the character string that is input by the user from the inputting device P6 via the signal line L1. An area 1702 shows the result of translation done by the translating device CI and input via the signal line L3. An area 1703 indicates messages and other indications output by the likelihood judging device P2 via the signal line L2. The area 1703 contains an area 1704 for displaying the judged language type, and an area 1705 for showing the likelihood information on each of different language types. This likelihood information varies with the ongoing user input. The area 1705 in the example of FIG. 17 is an area that shows likelihood information in bar chart form.

Figure 15:
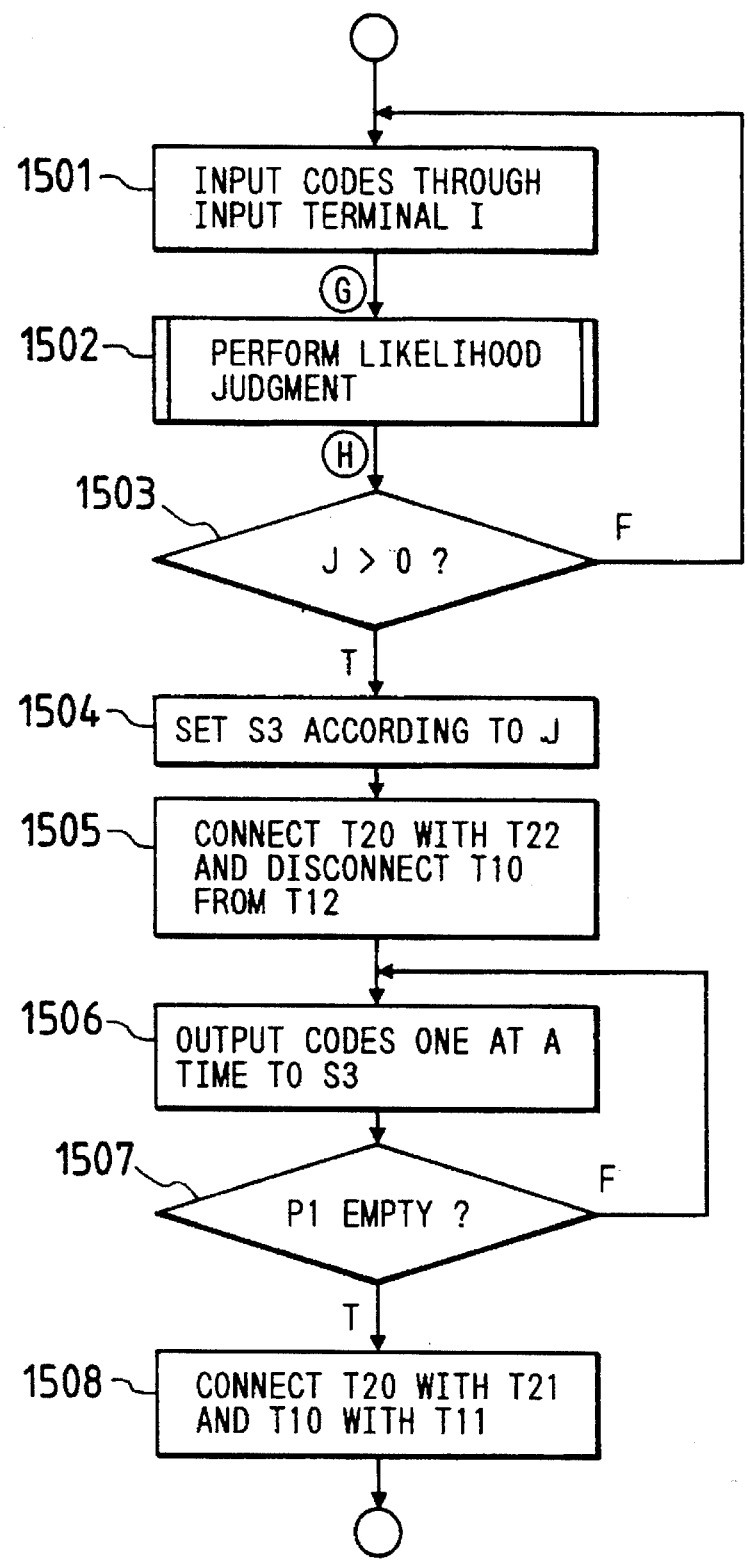
FIG. 15 is a flowchart of the steps for switching to an appropriate output destination depending on the result of likelihood judgment in accordance with the embodiment of FIG. 14.

FIG. 15 is a flowchart for indicating the operation of the code storing device P1 and likelihood judging device P2. A reset signal first initializes the switches S1, S2 and S3 so that the switch S1 connects T10 with T12 while the switches S2 and S3 leave their terminals disconnected. In step 1501, codes that are input from the input terminal I are stored sequentially by the code storing device P1, and the number of the input codes is counted and stored by the same device. The input codes are input concurrently to the likelihood judging device P2. In step 1502, the likelihood judging device P2 carries out likelihood judging processing to be described later. In step 1503, a check is made to see if the result of likelihood judgment has identified the language type. If the language type is successfully judged (J>0), the next step 1504 is attained; if the language type is not judged (J=0), step 1501 is reached again in which next codes are input.

Figure 16:
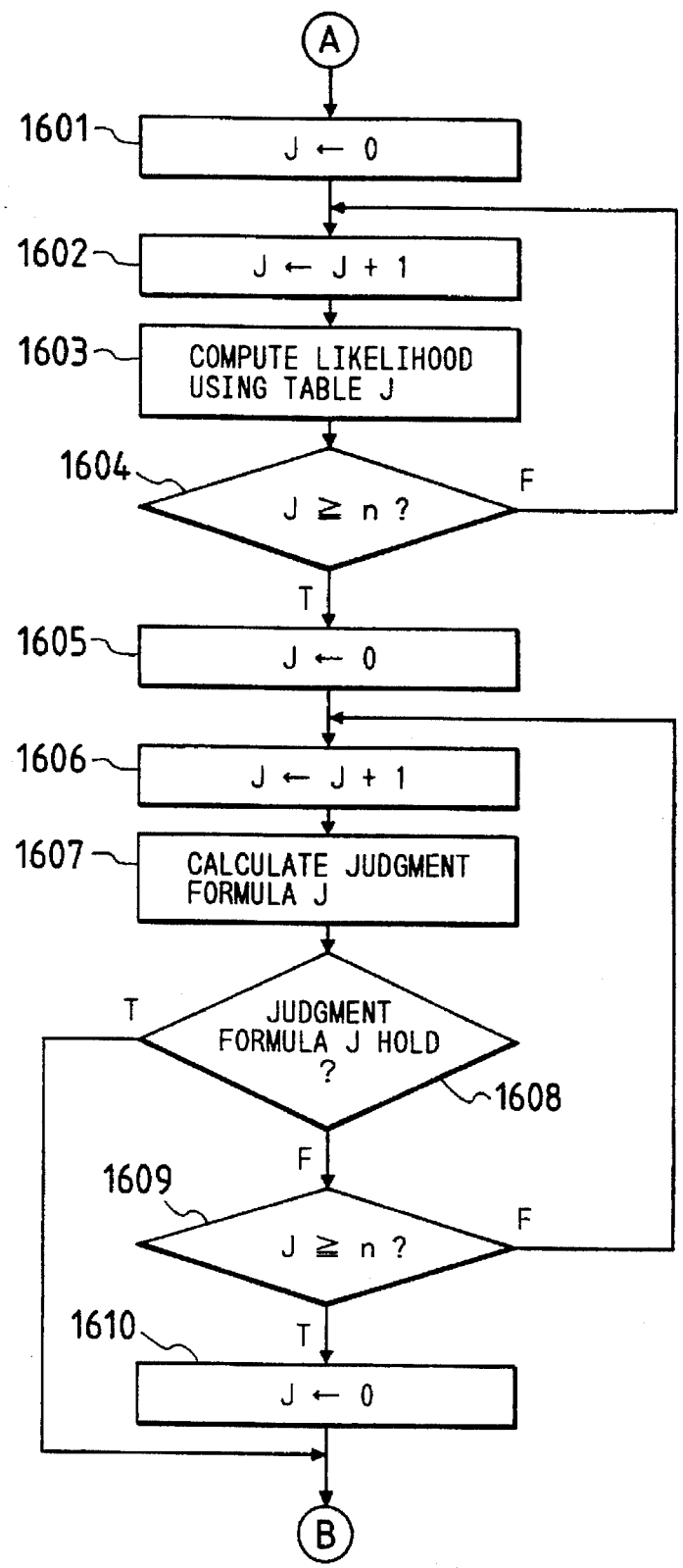
FIG. 16 is a flowchart of the steps for likelihood judgment processing in accordance with FIG. 14.

FIG. 16 is a flowchart for indicating the operation of likelihood judging processing which is basically the same as the character mode likelihood judging processing described earlier. Where there are n types of language types that may be judged, the input code string is judged for each of the different language types as follows. In step 1601 of FIG. 16, a control variable J is initialized to 0. In step 1602, the control variable J is incremented by 1. Each of the alphabetic characters appears at a substantially constant statistic frequency in each European language, apart from some variations that occur depending on the context. This embodiment relies basically on the statistical consistency of such character appearance frequencies in each language. Specifically, the likelihood of an input character string is obtained by the embodiment as follows. An appearance frequency Pa of a given character a in each language is acquired beforehand. After the frequency Pa is obtained for each of the characters constituting a character string, the values are inserted in Formula 1

$$\left( V = R \sum_{a} \log Pa; \text{ described earlier} \right)$$

to compute the likelihood value of that character string. In Formula 1, the value R is unique to each of the different languages so that the likelihood values V will be normalized for absolute comparison between the languages. Comparing the values V determines how likely the character string applies to each of different languages.

In step 1603, the likelihood values V are obtained. Specifically, a likelihood table is used to compute the likelihood of the input code string with respect to each of the different languages as shown in Table 3 below. The likelihood table is a language-wise character likelihood table which contains the likelihood value of the code representing each character in each of different language types (represented by J) and which is used to acquire the likelihood value of each character (code) in each language.

TABLE 3

Language-wise Character Likelihood Table

| | | J | | |
|---|---|---|---|---|
| Code | Character | 1 English Likelihood | 2 German Likelihood | 3 French Likelihood |
| 01 | a | 86 | 73 | 82 |
| 02 | b | 49 | 56 | 42 |
| 03 | c | 71 | 65 | 68 |
| 04 | d | 72 | 76 | 73 |
| 05 | e | 91 | 99 | 98 |
| 06 | f | 59 | 51 | 49 |
| 07 | g | 55 | 65 | 37 |
| 08 | h | 72 | 72 | 31 |
| 09 | i | 80 | 81 | 81 |
| 10 | j | 22 | 34 | 21 |
| 11 | k | 25 | 49 | 0 |
| 12 | l | 68 | 69 | 74 |
| 13 | m | 67 | 57 | 65 |
| 14 | n | 81 | 86 | 84 |
| 15 | o | 82 | 61 | 80 |
| 16 | p | 66 | 37 | 63 |
| 17 | q | 0 | 0 | 37 |
| 18 | r | 81 | 82 | 81 |
| 19 | s | 77 | 79 | 81 |
| 20 | t | 86 | 80 | 80 |
| 21 | u | 61 | 75 | 80 |
| 22 | v | 41 | 44 | 55 |
| 23 | w | 50 | 53 | 0 |
| 24 | x | 10 | 0 | 31 |
| 25 | y | 47 | 0 | 21 |
| 26 | z | 0 | 60 | 21 |
| 27 | β | 0 | 32 | 0 |
| . | . | . | . | . |
| 41 | A | 86 | 73 | 82 |
| 42 | B | 49 | 56 | 42 |
| 43 | C | 71 | 65 | 68 |
| . | . | . | . | . |

As with the preceding embodiment, the likelihood table above comprises the values that are calculated beforehand by use of Formula 2 (R log Pa). These values are tabulated so as to facilitate the processing involved.

In step 1603, every time a code is input, the likelihood table is referenced to accumulate the likelihood value of that code Vn for each of the different languages. In step 1604, a check made to see if J has reached n, i.e., if the likelihood computation is carried out as many times as the number of language types. If the result of the check in step 1604 is affirmative, step 1605 is reached in which the control variable J is initialized to 0. In step 1606, the variable J is incremented by 1. In step 1607, likelihood judgment is performed using the judgment formulas below.

$$V_1 > \max(V_2, \ldots, V_{n-1}, V_n) + T \ldots \text{judgement formula 1}$$
$$V_2 > \max(V_1, \ldots, V_{n-1}, V_n) + T \ldots \text{judgement formula 2.}$$
$$\vdots$$
$$V_{n-1} > \max(V_1, V_2, \ldots, V_n) + T \ldots \text{judgement formula n-1}$$
$$V > \max(V_1, V_2, \ldots, V_{n-1}) + T \ldots \text{judgement formula n} \ldots$$
(4)

where, T is a control parameter representing a predetermined threshold value specific to a given system. These formulas are used to check if the discrepancy between the likeliest language type and the next likeliest exceeds the threshold value T, i.e., if the likelihood of the language type J is sufficiently higher than that of any other language type. When a judgment formula J is found to hold in step 1608, the likelihood judgment processing is terminated, and the control variable J is output. Steps 1606, 1607, 1608 and 1609 are repeated as many times as the number of the language types involved. If none of the judgment formulas holds, step 1610 is reached. In step 1610, the control variable J is set to 0, and the likelihood judgment processing comes to an end.

For example, assume that with n=3, a character string is judged for the language type of English (n=1), German (n=2) or French (n=3) and that T=30. Also assume that CI1 is an English-to-Japanese translating device, CI2 is a German-to-Japanese translating device, and CI3 is a French-to-Japanese translating device. When the user inputs "Auf Wiedersehen" (goodbye in German) one character at a time, the accumulated likelihood value for the 13th character "e" is 921 (=V1) for English, 956 (=V2) for German, and 869 (=V3) for French. Of the preceding judgment formulas, the judgment formula 2 holds since $$956 > \max(921, 869) + 30.$$

Figure 18A:
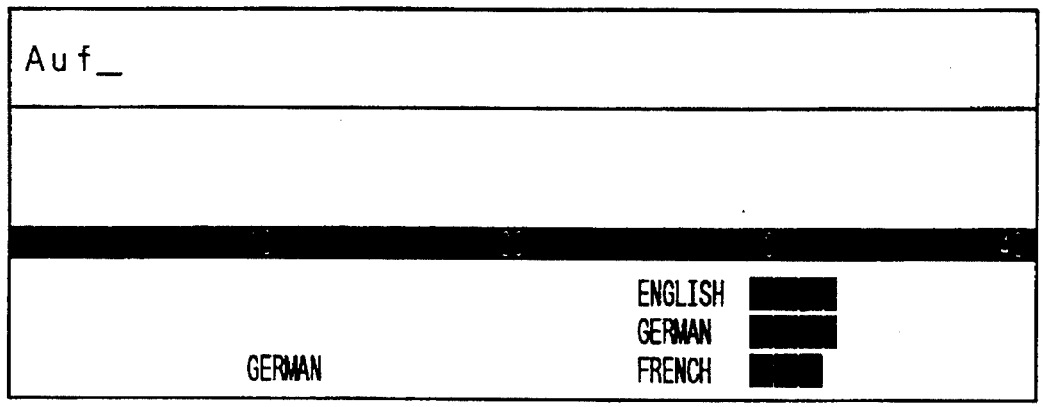
FIG. 18 is a set of views depicting other screen display examples of the embodiment of FIG. 14.
Figure 18B:
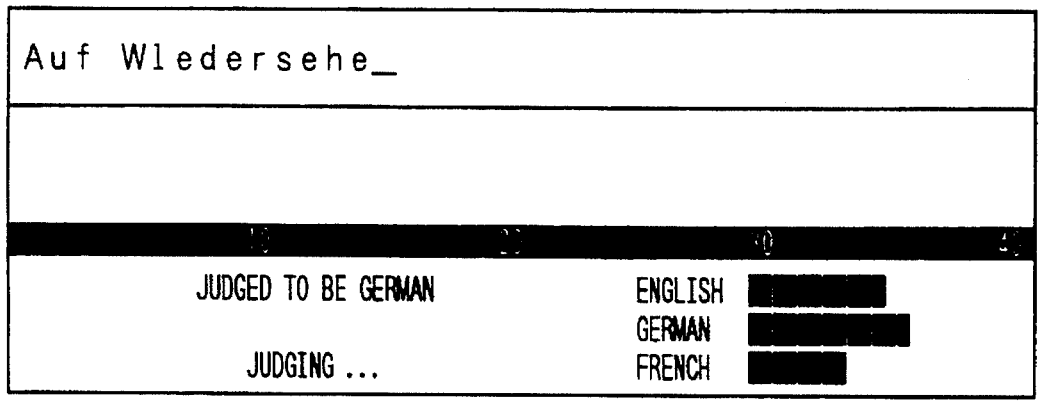

The likelihood value for a space is 0. Thus a value "2" is set to J, and the likelihood judgment processing is terminated. How the screen typically appears at this time is shown in FIGS. 18 (A) and 18 (B).

The likelihood judgment described above is carried out by the likelihood judging device P2. The result of judgment is sent from the likelihood judging device P2 to the display controller P3. The display device P4 may display a message "Judged to be German" as depicted in FIG. 18 (B) so that the user will have a clear understanding of the result.

In step 1503 of FIG. 15, a check is made to see if J is greater than 0. If the result of the check is affirmative, step 1504 is reached. In step 1504, the likelihood judging device P2 supplies the switch S3 with the value J corresponding to the control variable thereof. The switch S3 connects terminals T30 and T3J. Because J=2 in the above example, the terminal T30 is connected to the terminal T32. Furthermore, the likelihood judging device P2 supplies the code storing device P1 with a control signal indicating the end of judgment. In step 1505, the code storing device P1 disconnects the switch S1 and connects the terminals T20 and T22 of the switch S2.

In step 1506, the codes stored in the code storing device P1 are output one by one to the translating device CI in the order in which these codes were input. Appropriate terminals of the switch 53 are already connected by the likelihood judging device P2. With the terminals T30 and T32 connected in the example above, the codes are transmitted to the translating device CI2 (i.e., German-to-Japanese translating device).

Step 1506 is followed by step 1507 that checks to see if there exists no more code stored in the code storing device P1. Steps 1506 and 1507 are repeated until all codes are output from the code storing device P1. When the code storing device P1 is emptied, step 1508 is reached. In step 1508, the code storing device P1 outputs a control signal to the switches S1 and S2 so as to connect terminals T20 with T21 and T10 with T11. The code storing device P1 and likelihood judging device P2 then terminate their processing. Thereafter, all codes that are input through the input terminal I are sent direct to the translating devices CI. That is, the codes needed to judge the character are followed by the codes that are input direct to the translating devices CI.

The translating devices CI may select any one of various known levels and types of translation. For example, the translating devices CI may be designed to start its translation processing upon input of a sentence delimiting character ".". or "!", or upon a carriage return. This enhances operability by eliminating the need for the user to designate explicitly the start of each translation pass. A typical screen that appears during the above processing is shown in FIG. 17.

Where the invention is utilized as described, the user need only input the spelling of a word or a sentence without knowing the language type thereof. Simply inputting the spelling results in the translation desired.

One conventional way to do away with the designation of language types is to omit the likelihood judging device and to effect look up in all dictionaries provided for translation. This method requires complex linguistic analyses that often consume time and other resources. According to the present invention, the likelihood judging device first allows applicable translating device to be selected so that translation will proceed rapidly.

If the input character string is unique, the likelihood judging device may not discern the language type thereof or may make an erroneous judgment. This possibility is circumvented by enabling the input controller P5 to effect generation of two signals as needed. For example, one signal is output by the likelihood judging device P2 to the code storing device P1, and the other signal is a control signal that sets the switch S3 appropriately. In such a case, the user may look up the status of likelihood judgment in the area 1705 as shown in FIG. 17. The area 1705 displays the ongoing status in effect as the user inputs characters.

A system is now described that omits the translating devices CI. Although a number of translating methods have been proposed and practiced, there is yet to be implemented a system capable of translating one language to another as well as that achieved by human interpreters. Most prior art translating systems require pre-editing and post-editing of the target wording by human operators, and these systems take considerable time in carrying out their tasks. In the current state of the art, users still have difficulty in communicating via translating machines with people who speak foreign languages. Meanwhile, recent progress in communication facilities and the increasing globalization of national communities are highlighting the need for high-speed translation and communication means at all levels of human interchange. Considerable dependence on human interpreters in this respect will probably continue for some years to come.

Today, attention is drawn to growing numbers of personal computers communicating with one another over communication lines. This is a viable means of communication that replaces some of the traditional telephone and facsimile machines. During computer-based communication, people who speak different languages may communicate with one another in real time (so- called chattering) through the intervention of a human interpreter. In such a case, the likelihood judging device according to the invention offers advantages that facilitate the communications. How the invention applies to this type of system will now be described with reference to the accompanying drawings.

Figure 19:
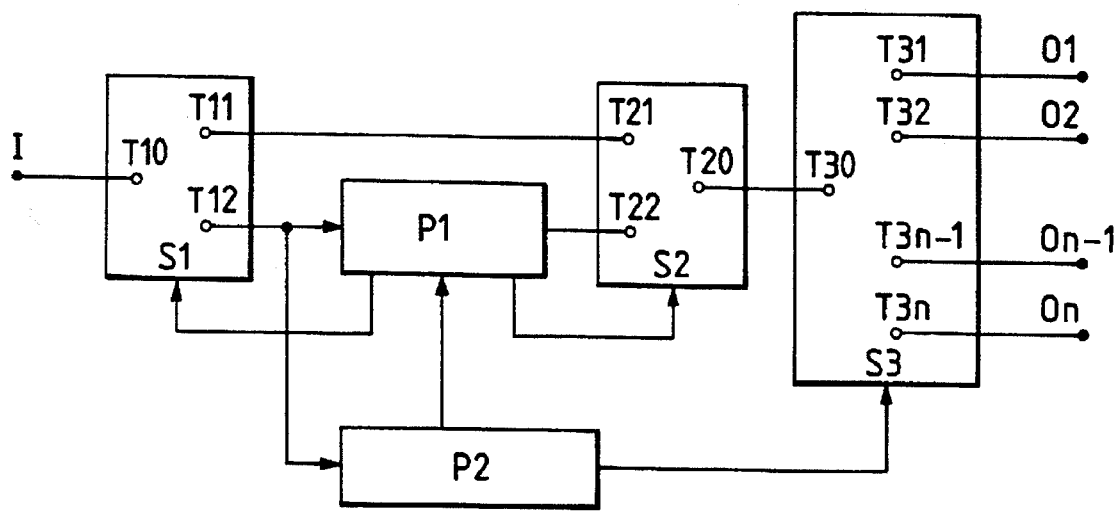
FIG. 19 is a block diagram of the language type judging unit contained in the embodiment of FIG. 14.

FIG. 19 is a block diagram of a language type judging unit. This independent unit is made of those components in FIG. 14 which address the judging of language types. The operation of the language type judging unit has already been described. That is, the language type is judged based on the codes that are input through the input terminal I. The switch S3 is set according to the language type thus determined so that the codes will be output to one of output terminals O1, O2, ..., On.

Figure 20:
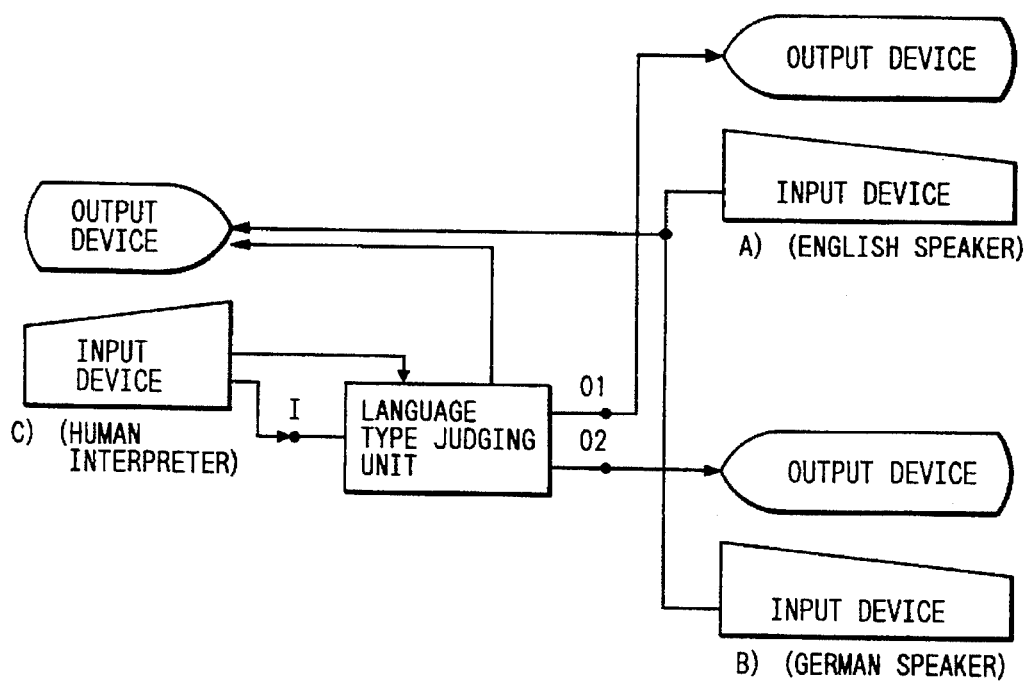
FIG. 20 shows a typical personal computer communication system.

FIG. 20 is an illustration of a typical personal computer communication system that utilizes the language type judging unit of the present invention. In FIG. 20, user A's native language is English and that of a user B is German. The users A and B are to communicate with each other through an interpreter C. In this case, the interpreter C is required conventionally to work in one of two computer configurations. In one configuration, the interpreter C sits at two personal computers connected separately to terminals of the users A and B. During a translating session, the interpreter translates the character string displayed on the screen of one computer (e.g., of user A) and inputs the translated result into the screen of the other computer (e.g., of user B). The process is alternately repeated during the session. In the other computer configuration, the interpreter C sits at a computer connected to two computers of the users A and B. The interpreter's screen displays transmissions from both users. The interpreter C switches the destination of the translated result depending on the user. In any case, the interpreter C's switching operation is vital in sparing both users from confronting meaningless messages appearing on their screens along with the wording to be translated. Each user has no need for a distracting translation of his message being displayed on his screen.

According to the present invention, as illustrated in FIG. 20, the interpreter C's transmission is sent to the language type judging unit that automatically determines the destination to which to send the translated result. In the example above, an English word or sentence from the interpreter C is automatically directed to the user A, and a German wording to the user B. Thus, the interpreter C need not become aware of the switching of the interpreter's transmissions and is able to concentrate solely on translating the input character strings.

As described, the invention allows the language type of the input character string to be determined automatically and the destination thereof to be judged automatically. In addition to the above embodiment, this aspect of the invention may be practiced in many other ways.

In the preceding embodiment, the characters correspond to the codes on a one-to-one basis. But in some cases, as discussed in connection with the determination of character modes, one code may represent different characters for different language types. This is particularly the case where the inputting device is a keyboard having key codes assigned to characters. In that case, a device for converting keystrokes to character codes may be provided upstream of the translating devices CI. In the arrangement of FIG. 19, the output from the output terminal On passes through the character code converting device and further through the translating device where necessary before being sent to the outside.

Figures 21A, 21B:
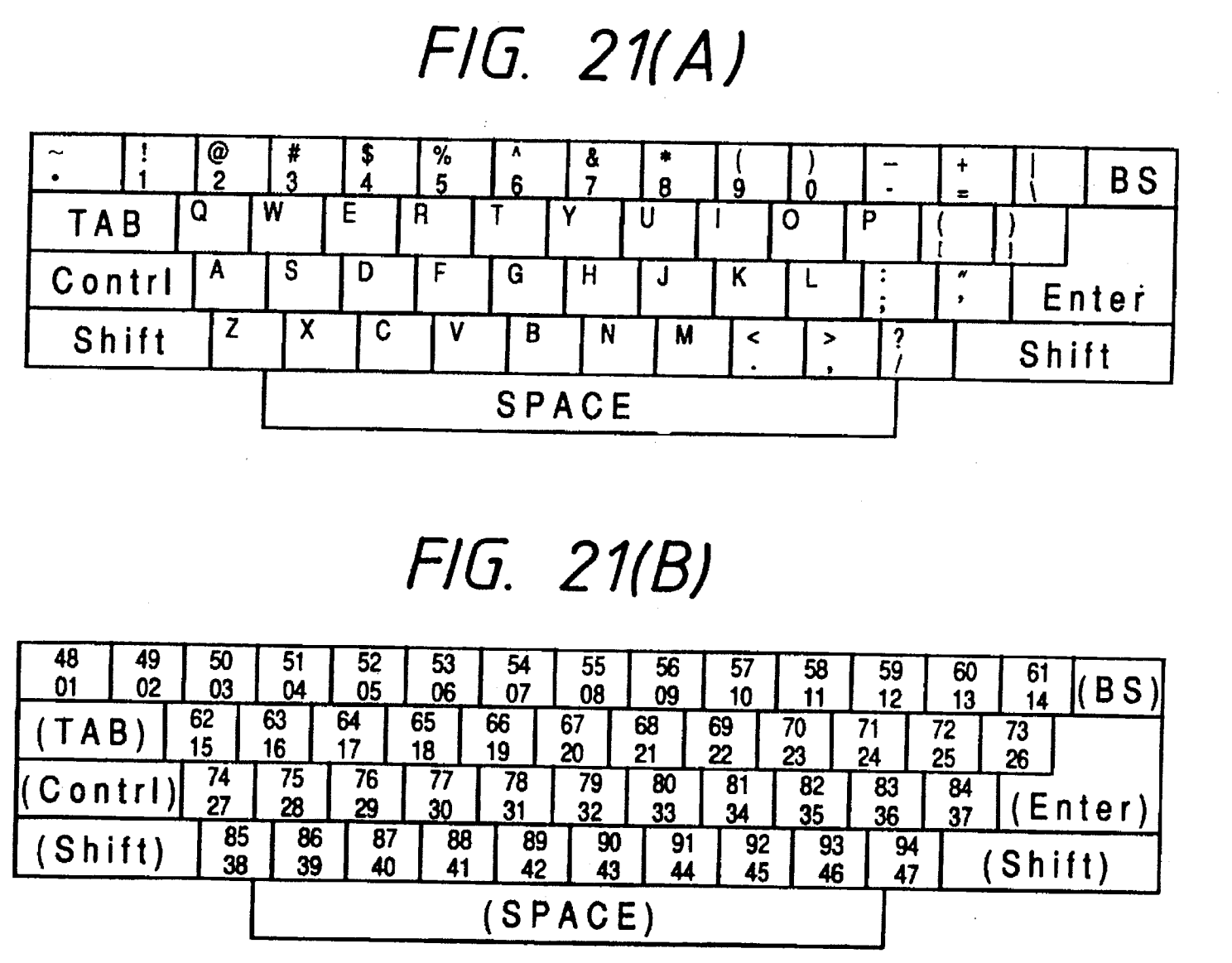

An embodiment incorporating the method and apparatus of the present invention for judging the error pattern of typographical errors is now described where the signal storing device will be referred to as the code storing device. FIG. 21(A) shows a keyboard having the most commonly used key arrangement. On this kind of keyboard, an operator operating keys at high speeds keeps returning his or her fingertips to the so-called home positions in order to ensure the correct correspondence between the keys and the fingers. During the so- called "blind touch" key input, the operator watches only the manuscript while the operator's fingers run on the keyboard. It often happens in such cases that the home positions of the fingers are erroneously shifted one key rightward or leftward. On the keyboard of FIG. 21 (A), the home positions of the right hand index finger, middle finger and third finger are on the keys "J," "K" and "L," respectively. Each key in the key rows above and below the J-K-L key row is assigned to a specific finger for operation with respect to the home positions. In this setup, shifting the right hand one key leftward causes the right hand index finger, middle finger and third finger to type "H," "J" and "K," respectively. Illustratively, the blind keystrokes that were supposed to input a word "information" actually enter a meaningless character string "ubfirnatuib."

The inputting method of this embodiment automatically detects such oft-encountered typographical errors, determines the type of the error committed, and corrects the erroneously input character string. The basic construction of this embodiment is the same as that shown in FIG. 14, except that the likelihood table of the likelihood judging device P2 is replaced with a typographical error likelihood table given as Table 4 below. Table 4 contains, for each error pattern J, the frequency of each key which appears in English and which is represented by a key code. These appearance frequencies are computed using Formula 2 (R log Pa) discussed earlier.

TABLE 4

Typographical Error Likelihood Table

J

| Key Code | Character | 1 Normal pattern Evaluation value | 2 Error pattern A Evaluation value | 3 Error pattern B Evaluation Value |
| --- | --- | --- | --- | --- |
| 01 | ` | 0 | 0 | 0 |
| 02 | 1 | 0 | 0 | 0 |
| 03 | 2 | 0 | 0 | 0 |
| 04 | 3 | 0 | 0 | 0 |
| 05 | 4 | 0 | 0 | 0 |
| . | . | . | . | . |
| . | . | . | . | . |
| 13 | = | 0 | 0 | 0 |
| 14 | \ | 0 | 0 | 0 |
| 15 | q | 0 | 0 | 0 |
| 16 | w | 50 | 0 | 50 |
| 17 | e | 91 | 50 | 91 |
| 18 | r | 81 | 91 | 81 |
| 19 | t | 86 | 81 | 89 |
| 20 | y | 47 | 86 | 61 |
| 21 | u | 61 | 47 | 80 |
| 22 | i | 80 | 61 | 82 |
| 23 | o | 82 | 80 | 66 |
| 24 | p | 66 | 82 | 0 |

TABLE 4-continued

Typographical Error Likelihood Table

| | | J | | |
|---|---|---|---|---|
| Key Code | Character | 1 Normal pattern Evaluation value | 2 Error pattern A Evaluation value | 3 Error pattern B Evaluation Value |
| 25 | [ | 0 | 66 | 0 |
| 26 | ] | 0 | 0 | 0 |
| 27 | a | 84 | 0 | 84 |
| 28 | s | 77 | 84 | 77 |
| 29 | d | 72 | 77 | 72 |
| 30 | f | 59 | 72 | 59 |
| 31 | g | 55 | 59 | 78 |
| . | . | . | . | . |
| . | . | . | . | . |
| . | . | . | . | . |
| 43 | n | 81 | 50 | 67 |
| 44 | m | 67 | 81 | 0 |
| 45 | , | 0 | 67 | 0 |
| 46 | . | 0 | 0 | 0 |
| 47 | / | 0 | 0 | 0 |
| 48 | ~ | 0 | 0 | 0 |
| 49 | ! | 0 | 0 | 0 |
| . | . | . | . | . |
| . | . | . | . | . |
| . | . | . | . | . |
| 92 | < | 0 | 51 | 0 |
| 93 | > | 0 | 0 | 0 |
| 94 | ? | 0 | 0 | 0 |

Each key code is a numerical definition of a key pressed on the keyboard. The key codes of the operated keys are input to the likelihood judging device P2. With the top leftmost key "" used as a reference "1" on the keyboard, the keys to the right in the same row are assigned key codes 2, 3, . . . , 13. In the second key row and on, the keys are continuously assigned their respective key codes, until last the "/" key is assigned a key code of 47. The shift key case of the key "" is assigned 48, and those of the remaining keys are likewise assigned key codes up to 94. The shift key case "!" of the last key "/" is assigned the code 94. FIG. 21 (B) illustrates how the keys correspond to their respective key codes. Table 4 also contains the likelihood values of input characters constituting the normal pattern pursuant to the home positions (J=1). The normal pattern is used for checks on whether keys have been typed normally. The error type B in Table 4 involves the right hand home positions being shifted one key leftward. Illustratively, in Table 4, the likelihood value of the key "u" in the normal pattern is moved to the key "y," and the likelihood value of the key "i" is moved to the key "u." The error pattern A involves both hands' home positions being shifted one key rightward.

In this embodiment, CI in FIG. 14 represents devices for correcting typographical errors rather than language-to-language translating devices. The typographical error correcting device will be described later in more detail. The display controller P4 overwrites the output from the typographical error correcting devices CI onto the already input character string from the input controller P5. Although the typographical error likelihood table of this embodiment contains the frequencies of characters for their appearance in English, the language type is not limited to English. With appropriate modifications, the table may also apply to French or German. This is also the case with the Japanese language kana keyboard mentioned earlier. Given the Japanese keyboard, the appearance frequencies of the kana or Roman characters expressing the Japanese wording are computed and tabulated. In that case, typographical error likelihood tables are switched to comply with the alphanumeric mode, kana mode or Roman character mode being selected. Any selected table is used in the same manner described above.

Figure 22:
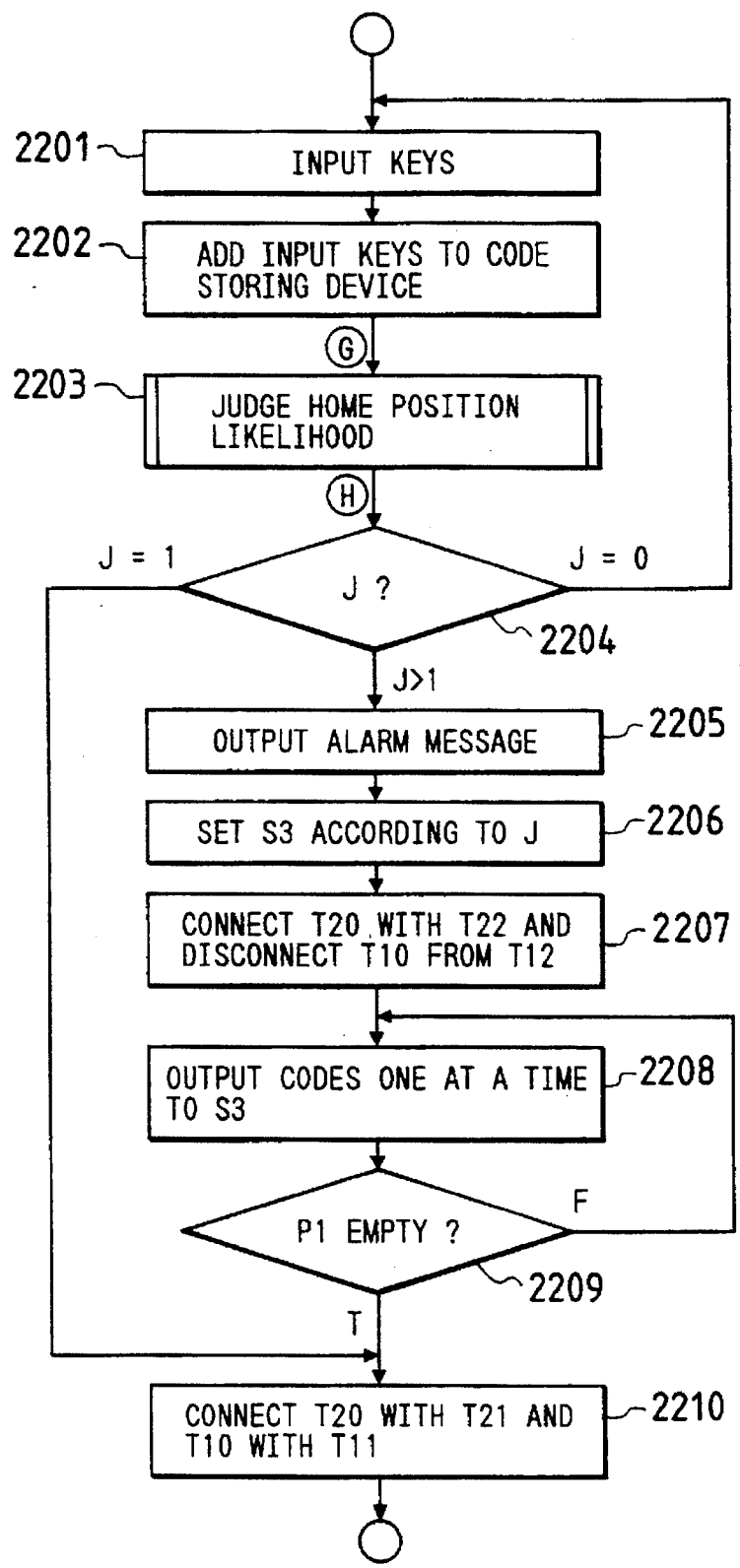
FIG. 22 is a flowchart of the steps for typographical error judgment processing according to the present invention.

The operation of this embodiment is now described with reference to the flow chart of FIG. 22. In step 2201, keys are operated. In step 2202, the key codes from the typed keys are stored sequentially in the code storing device P1 and are displayed concurrently on the display device P4. In step 2203, typographical error likelihood judgment is carried out. What the likelihood judging device P2 does at this point was already described and the description will not be repeated. In step 2204, a check is made to pick one of three possibilities as a result of the judgment: the result is an error pattern (J>1), the result is the normal pattern (J=1), or the judgment is unavailable (J=0). In case of the error pattern, step 2205 is reached in which alarm generation is initiated. If the normal pattern is detected, step 2210 is reached in which the switches S1 and S2 are set before the processing is terminated. If the judgment is unavailable, step 2201 is again reached in which the next key input is accepted.

In the alarm generation processing, the user is presented with an alarm message, and the already input character string is replaced by a character string corrected by the typographical error correcting devices CI. The alarm message is output from the likelihood judging devices P2 to the display controller P3. Given the error pattern identified by J, the typographical error correcting means CI replaces the erroneously input codes with the correct key codes by referring to a typographical error correction table. This table has the correct key codes corresponding to the erroneously input codes. After correction, the codes are output to the display controller P3. An example of the typographical error correction table is shown as Table 5 below.

TABLE 5

Typographical Error Correction Table

| | J | |
|---|---|---|
| Key code | 2 Error pattern A | 3 Error pattern B |
| 01 | 01 | 01 |
| 02 | 01 | 02 |
| 03 | 02 | 03 |
| 04 | 03 | 04 |
| 05 | 04 | 05 |
| . | . | . |
| . | . | . |
| . | . | . |
| 13 | 12 | 14 |
| 14 | 13 | (BS) |
| 15 | (TAB) | 15 |
| 16 | 15 | 16 |
| 17 | 16 | 17 |
| 18 | 17 | 18 |
| 19 | 18 | 19 |
| 20 | 19 | 20 |
| 21 | 20 | 21 |
| 22 | 21 | 22 |
| 23 | 22 | 23 |
| 24 | 23 | 24 |
| 25 | 24 | 25 |
| 26 | 25 | (Enter) |
| 27 | (Cntrl) | 27 |
| 28 | 27 | 28 |
| 29 | 28 | 29 |
| 30 | 29 | 30 |
| 31 | 30 | 31 |
| . | . | . |

TABLE 5-continued

Typographical Error Correction Table

| | J | |
|---|---|---|
| Key code | 2<br>Error pattern A | 3<br>Error pattern B |
| . | . | . |
| . | . | . |
| . | . | . |
| 43 | 42 | 43 |
| 44 | 43 | 44 |
| 45 | 44 | 45 |
| 46 | 45 | 46 |
| 47 | 46 | (Shift) |
| 48 | 47 | 48 |
| 49 | 48 | 49 |
| . | . | . |
| . | . | . |
| . | . | . |
| 92 | 91 | 92 |
| 93 | 92 | 93 |
| 94 | 93 | (Shift) |

Figure 23A:
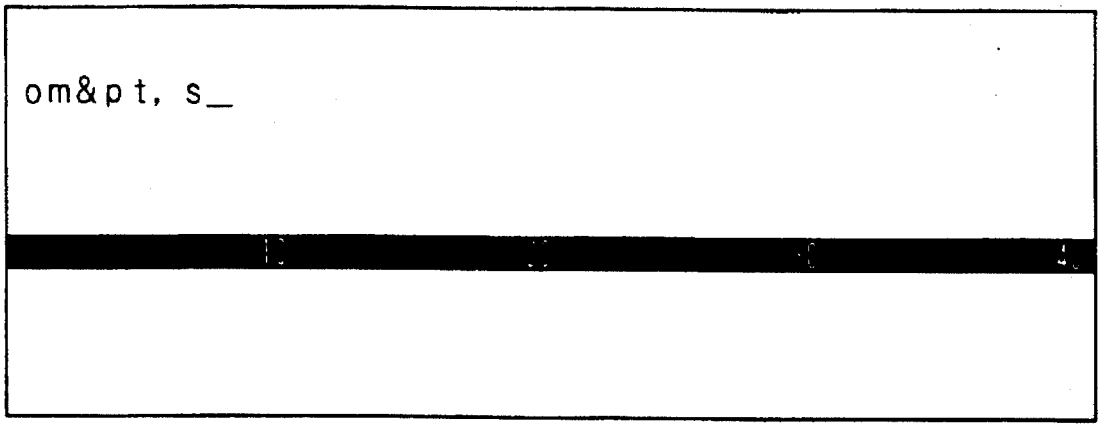
FIGS. 23(A)-23(C) show depicting screen display examples of the present invention for typographical error judgment processing.
Figure 23B:
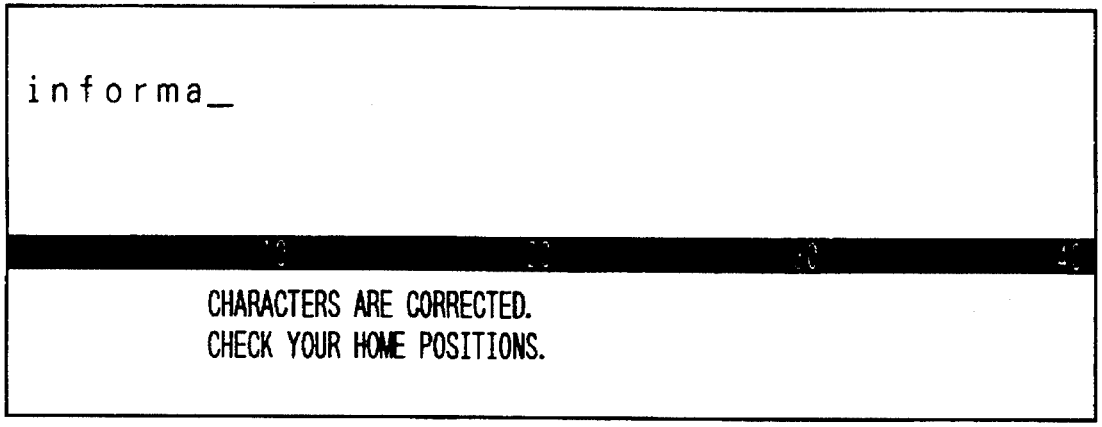
Figure 23C:
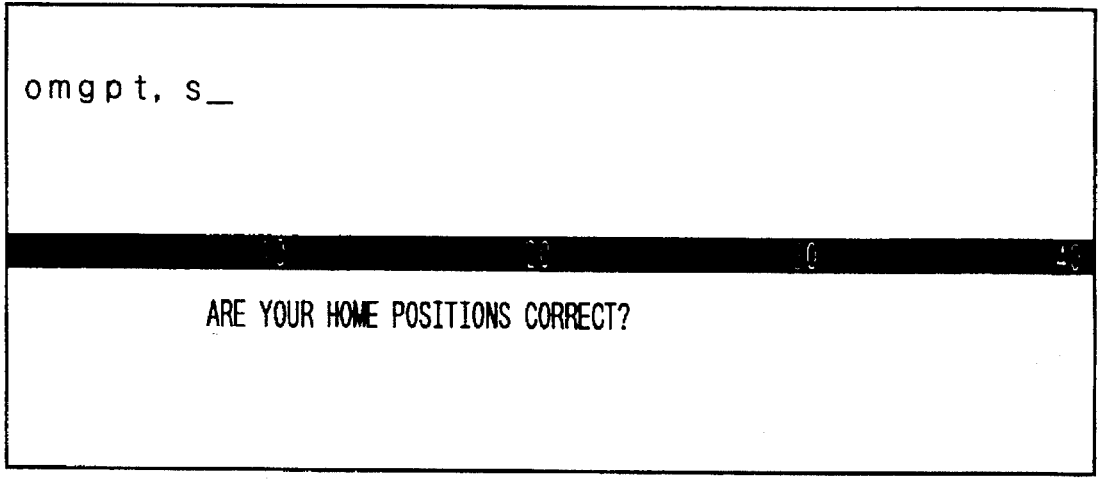

Suppose that T=300 when n=3 in Tables 4 and 5. Also suppose that when the user tries to enter a character string "information," the home positions of both his hands are shifted one key rightward without the user noticing it. In that case, the actually input character string is "omgpt,syopm." This character string is represented by key codes "23, 44, 31, 24, 19, 45, 28, 20, 23, 24, 44." From the typographical error correction table, it is then possible to obtain a likelihood value V1 (=429) for the normal pattern, a likelihood value V2 (=534) for the error pattern A and a likelihood value V3 (=307) for the error pattern B. Since $$534 > \max(429, 307) + 100$$

the error pattern A is most likely to be applicable, and J is set to 2. The screen displays a message indication directed to the user. The codes stored in the code storing device P1 are output to the typographical error correcting device CI2. Referencing the column "J=2" in Table 5 (typographical error correction table), the typographical error correcting device CI2 replaces the code string "23, 44, 31, 24, 19, 45, 28" with a new code string "22, 43, 30, 23, 18, 43, 27," the latter being output to the display controller P3. The display controller P3 converts the input code string into a character string that replaces the already input character string. Typical screens that appear at this point are shown in FIGS. 23(A)–23(C).

As described, the present invention automatically detects input errors caused by the erroneous shift of users' home positions on the keyboard and replaces such errors with correct character strings. In view of the nature of typographical errors, the code storing device P2, the likelihood judging device P2, and the switches S1, S2 and S3 should preferably be re-initialized when the user's fingertips leave the surfaces of the character keys (i.e., home positions). That is, the timing of the re-initialization should be upon a carriage return or upon operation of a cursor key or editing key.

Although the above embodiment was shown to replace the already input character string with a correct character string, an alternative embodiment may limit itself to generating only an alarm signal, as depicted in FIG. 23 (C). With this alternative, there is no need to furnish the code storing device P1, the switches S1 through S3 and the typographical error correcting device CI. Furthermore, there is no need to specify an error type. All that is needed is to check if the discrepancy between the likelihood value V1 of the normal pattern and the highest likelihood value (V2, . . . , Vn) of the likeliest error pattern exceeds a threshold value T. This judgment is carried out using the following formula:

$$\max(V2, \ldots, Vn-1, Vn) > V1 + T \quad (5)$$

The typographical error correcting device CI1 is basically not needed to deal with the normal pattern.

Although the above embodiment has dealt with the inadvertent shift of the home positions to the right or left, this is not limitative of the invention. With appropriate modifications added, the typographical error likelihood table and the typographical error correction table may address other erroneous home position shifts in upward or downward directions or combinations of shifts in diverse directions.

The invention may also address shift lock setting errors. Many keyboards have shift lock keys that are used to distinguish upper-case letters from lower-case letters. An erroneous operation of the shift lock key may result in inputting "kING" instead of "King." This type of error is addressed by supplementing the typographical error likelihood table with an error pattern having the likelihood values of the normal pattern switched between shift case and unshifted case. Referencing the supplemented typographical error likelihood table allows shift lock setting errors to be detected. Likewise, the typographical error likelihood table may be modified to address shift setting errors involving the "caps lock" key (for alphabetic characters only).

An embodiment incorporating the method of the present invention and apparatus for automatically determining and selecting a character code system for use in computer-based communication is now described. The apparatus as embodied hereunder allows computers operating on different character code systems to communicate with each other using a common code system. When a user at one computer does not know the character code system of the other computer, the inventive apparatus prevents unintelligible character strings from appearing on either party's screen during communication. In the following description that follows, the signal storing device will be called the code storing device.

Figure 24:
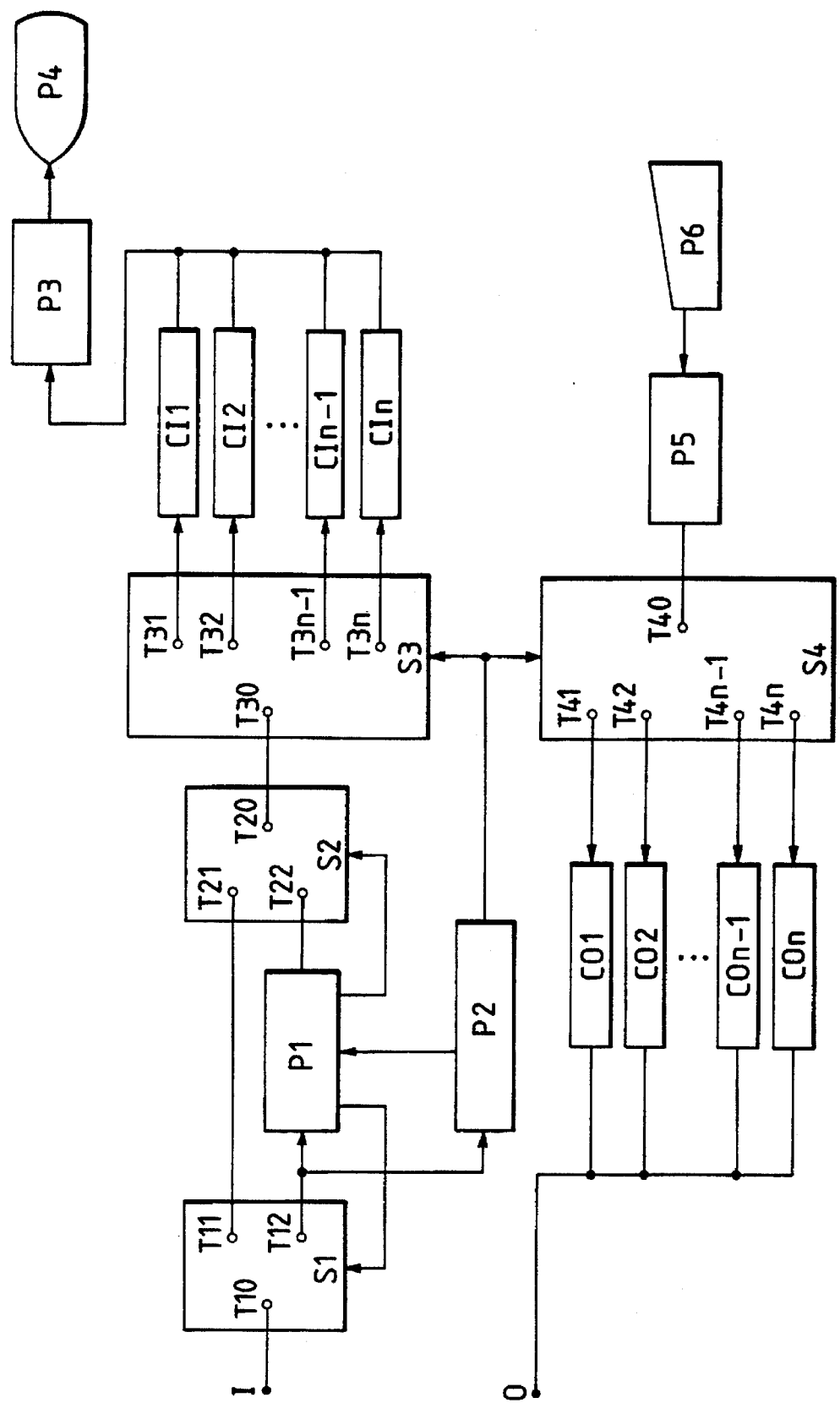
FIG. 24 is a block diagram of another embodiment of the present invention.

FIG. 24 is a block diagram of this embodiment and differs from that of FIG. 14 in that the input terminal I is connected to an external apparatus; that a control signal from the likelihood judging device P2 controls a newly provided switch S4; that the output from the input controller P5 passes through character code system backward converting devices CO1, CO2, COn–1 or COn (collectively referred to as CO) selected by the switch S4 and is forwarded to the terminal O; and that the terminal O is connected to another external apparatus. In FIG. 24, character code system converting devices CI convert input codes to codes of a predetermined character code system in accordance with the selected character code system.

Character code systems will now be discussed in connection with computer-based communication. Character code systems differ from manufacturer to manufacturer and from device type to device type. Illustratively, a device type 1 has a character code system 1 in Table 6 below. A code string "59, 76, 76, 72, 6E (hexadecimal)" in Table 6 representing "apple" on a device type 1 turns into "Yvvre" on a device type 2 whose character code system 2 is shown in Table 7 below. On the other hand, a code string "4B, 69, 6E, 67" representing "King" on the device 2 turns into ",i>g" on the device type 1. In other words, when users communicate with each other using computers having different character code systems, establishing physical interface arrangements is not sufficient to exchange meaningful character strings between the users.

TABLE 6

Character Code System 1

| Low order | High Order | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | | | (SP) | | | & | — | j | s | | w | y | { | } | $ | 0 |
| 1 | | | | | | | / | k | | | | z | A | J | | 1 |
| 2 | | | | | | | b | l | | | | | B | K | S | 2 |
| 3 | | | | | | | c | m | | | | | C | L | T | 3 |
| 4 | | | | | | | d | n | | | | | D | M | U | 4 |
| 5 | | | | | | | e | o | | | | | E | N | V | 5 |
| 6 | | | | | | | f | p | | | | | F | O | W | 6 |
| 7 | | | | | | | g | q | | | | | G | P | X | 7 |
| 8 | | | | | | | h | r | | | | | H | Q | Y | 8 |
| 9 | | | | | | a | i | ` | | | | | I | R | Z | 9 |
| A | | | [ | ] | | | l | : | t | u | x | | | | | |
| B | | | . | ¥ | | | , | # | | | | | | | | |
| C | | | < | * | | | % | @ | | | | | | | | |
| D | | | ( | ) | | | _ | ' | | | | | | | | |
| E | | | + | ; | | | > | = | | | | | | | | |
| F | | | ! | ^ | | | ? | " | | | | | | | | |

TABLE 7

Character Code System 2

| Low order | High Order | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | | | (SP) | 0 | @ | P | ` | p | | | | | | | | |
| 1 | | | ! | 1 | A | Q | a | q | | | | | | | | |
| 2 | | | " | 2 | B | R | b | r | | | | | | | | |
| 3 | | | # | 3 | C | S | c | s | | | | | | | | |
| 4 | | | $ | 4 | D | T | d | t | | | | | | | | |
| 5 | | | % | 5 | E | U | e | u | | | | | | | | |
| 6 | | | & | 6 | F | V | f | v | | | | | | | | |
| 7 | | | ' | 7 | G | W | g | w | | | | | | | | |
| 8 | | | ( | 8 | H | X | h | x | | | | | | | | |
| 9 | | | ) | 9 | I | Y | i | y | | | | | | | | |
| A | | | * | : | J | Z | j | z | | | | | | | | |
| B | | | + | ; | K | [ | k | { | | | | | | | | |
| C | | | , | < | L | ¥ | l | \| | | | | | | | | |
| D | | | — | = | M | ] | m | } | | | | | | | | |
| E | | | . | > | N | ^ | n | — | | | | | | | | |
| F | | | / | ? | O | _ | o | | | | | | | | | |

The code storing device P1 and the likelihood judging device P2 operate as described earlier. In this embodiment, the control signal sent from the likelihood judging device P2 to the switch S3 is also forwarded to the switch S4. Operating the backward converting devices CO appropriately allows the switch S4 to output the codes coming from the inputting device P6 to the output terminal O in accordance with the character code system of the other party. The likelihood table for use in judging a character code system is a character code system likelihood table as shown in Table 8 below. This table comprises the likelihood values representing the appearance frequencies of the codes of a given character code system J, the values having been computed with Formula 2 (R log Pa).

TABLE 8

Character Code System Likelihood Table

| | J | | | |
|---|---|---|---|---|
| | 1 | | 2 | |
| Code | Character code | Evaluation value | Character code | Evaluation value |
| 20 | | −99 | (SP) | 60 |
| 21 | | −99 | ! | 30 |
| 22 | | −99 | " | 49 |
| . | . | . | . | . |
| . | . | . | . | . |
| . | . | . | . | . |
| 59 | a | 90 | Y | 23 |
| . | . | . | . | . |
| . | . | . | . | . |
| 65 | e | 91 | e | 91 |
| 66 | f | 60 | f | 60 |
| 67 | g | 55 | g | 55 |
| 68 | h | 70 | h | 70 |
| 69 | i | 80 | i | 80 |
| 6A | l | 1 | j | 21 |
| 6B | , | 8 | k | 26 |
| 6C | % | 2 | l | 60 |
| 6D | — | 1 | m | 58 |
| 6E | > | 2 | n | 80 |
| . | . | . | . | . |
| . | . | . | . | . |
| 72 | l | 60 | r | 81 |
| 73 | m | 58 | s | 77 |
| 74 | n | 80 | t | 85 |
| 75 | o | 81 | u | 63 |
| 76 | p | 63 | v | 40 |
| 77 | q | 01 | w | 50 |
| . | . | . | . | . |
| . | . | . | . | . |
| FF | | −99 | | −99 |

For example, the code string "4B, 69, 6E, 67" representing "King" in the character code system 2 has a total likelihood value V2 of 285. The same code string has a total likelihood value V1 of 130 in the character code system 1. When T=50, the character code system is judged to be 2 (=J) by use of the character mode judgment formulas discussed earlier.

In FIG. 15, when likelihood judgment is carried out (J>0) in step 1503, step 1504 is reached. In step 1504, the likelihood judging device P2 supplies not only the switch S3 but also the switch S4 with a value J representing the control variable. This connects terminals T40 and T42. That is, since J=2 in the previous embodiment, the terminal T40 is connected with the terminal T42.

The character code system converting device CI convert codes of a given character code system to the codes representing the same characters in another character code system. For example, if the predetermined character code system is the one shown in Table 6, the character code converting device looks up both Table 6 and Table 9 (character code conversion table) as shown below for character conversion.

TABLE 9

Character Code Conversion Table

| Predetermined code | | J | |
|---|---|---|---|
| Character | Code | 1 | 2 |
| . | . | . | . |
| . | . | . | . |
| . | . | . | . |
| a | 59 | 59 | 61 |
| ] | 5A | 5A | 5B |
| ¥ | 5B | 5B | 5C |
| * | 5C | 5C | 2A |
| ) | 5D | 5D | 29 |
| ; | 5E | 5E | 3B |
| ^ | 5F | 5F | 5E |
| — | 60 | 60 | 2D |
| / | 61 | 61 | 2F |
| b | 62 | 62 | 62 |
| c | 63 | 63 | 63 |
| d | 64 | 64 | 64 |
| e | 65 | 65 | 65 |
| f | 66 | 66 | 66 |
| . | . | . | . |
| . | . | . | . |
| . | . | . | . |

Since CI2 is currently selected, the previously indicated code string "6B, 69, 6E, 67" is compared with the codes under the heading "J=2" in Table 9. The codes making up the string are matched sideways with, and converted to, the corresponding predetermined codes found on their side. Thus the string "6B, 69, 6E, 67" is converted to a string "71, 69, 74, 67." CI converts the codes one at a time and outputs the converted codes to the display controller P3. In turn, the display controller P3 converts the codes it received into characters by looking up Table 6, the characters being sent to the display device P4 for display. As a result, the display device P4 displays the initially transmitted character string "King" as intended.

At this point, the switch S4 is being set under the direction of the likelihood judging device P2. If the user inputs characters using the inputting device P6, the resulting signals output by the inputting device P6 are converted by the input controller P5 into codes of the character code system shown in Table 6. The converted codes are output to the devices CO via the switch S4. The devices CO provides conversion in the backward direction of what is offered by the devices CI. That is, the codes received from the input controller P5 are used as keys by which to look up the predetermined code column in Table 9. Each matched code is converted to the code found on the same row and in the column designated by "J." After conversion, each code is output to the output terminal O.

In the embodiment above, the switch S4 has its terminals T40 and T42 connected. Thus the codes passing through the switch S4 are sent to the character code system backward converting device CO2. If the user inputs "jack" through the inputting device P6, the input controller P5 outputs a code string "70, 59, 63, 71." The code string is converted by the character code system backward converting device CO2 into a code string "6A, 61, 63, 6B" for output through the output terminal O. In this manner, the character code system interface is established automatically at the time the user receives a first message. This allows the user to concentrate subsequently on the user's input without becoming aware of the character code system of the other party's computer.

In the above examples, the code input source has been assumed to be the originator of communication. Alternatively, it may be desired that the result of communication be downloaded temporarily into a file device before display. In that case, the file device is regarded as the input source. That is, the invention may be used correctly to read those files to which the logic file format is common but of which the character code systems are different. Thus it is not mandatory for two communicating computers to be physically connected to each other.

As described and according to the invention, the user is able to input characters without becoming aware of the character mode currently in effect. This boosts the efficiency of character input. In particular, novice users are required to operate fewer keys, which contributes significantly to alleviating the operative burdens on these relatively unskilled users during their character input sessions. In addition, the guidance display assists the user in mastering key operations more quickly than usual.

Also according to the invention, the user need not know in advance the language type of character strings to be translated. This provides for quicker acquisition of translated results. If the home positions of the user's fingers are erroneously shifted on the keyboard during input, the error is automatically detected and corrected. This further contributes to reducing the stress and frustration some users experience during their typing sessions. Furthermore, the invention allows a user at one computer running on one character code system to communicate with another user at another computer using a different character code system. Neither of the users needs to know the other party's code system beforehand.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A method of determining at least one character in response to a received signal representing at least one character of a plurality of characters generated by utilizing an input device including a keyboard having said plurality of characters corresponding to at least one of a plurality of languages, the signal being generated by selection of at least one of the character keys, said method comprising the steps, executed by a processing apparatus, of:

receiving said signal representing at least one character of said plurality of characters;

evaluating likelihood values corresponding to said signal, wherein the step of evaluating includes assigning likelihood values for each of said plurality of characters represented by said signal and each of a plurality of character destinations represented by said signal, and effecting evaluation of the assigned likelihood values; and selecting at least one character of said plurality of characters determined in accordance with the evaluated likelihood values.

2. A method according to claim 1, wherein each character key is indicative of a plurality of characters representing different languages.

3. A method according to claim 1, wherein the step of assigning likelihood values includes the steps of holding received signals sequentially and assigning a likelihood value at least one of in accordance with the continuity between one held signal and the next held signal and in accordance with the frequency of each signal.

4. A method according to claim 1, wherein said likelihood values are determined using a statistical method.

5. A method according to claim 1, wherein the keyboard includes a plurality of character mode keys, one of the character mode keys being set for selecting said at least one character of said plurality of characters of the selected character key which is used for generating said signal, and further comprising the step of displaying the character in accordance with the set character mode key and selected character key.

6. A method according to claim 5, further comprising the step of displaying a message in addition to the displayed character.

7. A method according to claim 6, wherein the step of displaying a message includes displaying a message indicating the possibility that a displayed character is an incorrect character based upon the evaluated likelihood values.

8. A method according to claim 7, wherein the displayed message requests a user to at least one of verify that a correct character mode has been selected and to effect changeover to a correct character mode.

9. A method according to claim 7, further comprising the step of changing the displayed character displayed in accordance with the set character mode key to a correct character display based upon the evaluation of the likelihood values for the displayed character.

10. A method according to claim 9, further comprising the step of outputting the correct character for processing based upon the likelihood value evaluation.

11. A method according to claim 5, wherein the step of evaluating includes converting said received signal into character codes for each of the plurality of characters and evaluating the likelihood values for the respective character codes, and the step of selecting includes selecting a character code in accordance with the evaluated likelihood values and enabling changing of a character mode when the evaluated likelihood values for a character code is determined to be different from a character code for the set character mode.

12. A method according to claim 11, wherein the step of enabling changing of a character mode is effected upon evaluation of a predetermined number of received signals representing a character string of characters, displaying the characters corresponding to the set character mode in accordance with the received signals and upon determining that a different character mode should utilized, at least one of displaying a message that the character mode should be changed and effecting change of the character mode.

13. A method according to claim 12, wherein upon determining that a different character mode should be utilized, displaying a message indicative thereof.

14. A method according to claim 12, wherein after displaying a message indicative that the character mode should be changed, enabling a user to effect change of a character mode and displaying the characters in accordance with the changed character mode.

15. A method according to claim 14, further comprising the step of enabling processing of characters of the received signals in accordance with the changed character mode.

16. A method according to claim 12, wherein the evaluation of a predetermined number of received signals includes effecting a summation of likelihood values for the predetermined number of received signals for a respective character mode and effecting comparison among the summations for the respective character modes.

17. A method according to claim 16, wherein the summation includes predetermined threshold values.

18. A method according to claim 1, wherein said received signal represents a plurality of destinations for a character to which the received signal is transmittable, and the step of selecting includes selecting the likeliest destination for the received signal in accordance with the evaluated assigned likelihood values thereof.

19. A method according to claim 18, wherein each signal represents a character having destinations corresponding to different languages.

20. A method according to claim 18, wherein the step of evaluating includes effecting evaluation upon receipt of a predetermined number of signals representing a character string of characters and displaying the characters of the string, and the step of selecting includes displaying a message indicative of a destination based upon the likelihood values.

21. An apparatus for determining at least one character in response to a received signal representing at least one character of a plurality of characters generated by utilizing an input device including a keyboard having said plurality of characters corresponding to at least one of a plurality of languages, the signal being generated by selection of at least one of the character keys, comprising:

means for receiving said signal representing at least one character of said plurality of characters from said input device;

means for evaluating likelihood values corresponding to said signal,
wherein said means for evaluating includes means for assigning likelihood values for each of said plurality of characters represented by said signal and each of the plurality of character destinations represented by said signal, and means for effecting evaluation of the assigned likelihood values; and means for selecting at least one character of said plurality of characters determined in accordance with the evaluated likelihood values.

22. An apparatus according to claim 21, wherein each character key is indicative of a plurality of characters representing different languages.

23. An apparatus according to claim 21, wherein said means for assigning likelihood values includes means for holding received signals sequentially and for assigning a likelihood value at least one of in accordance with the continuity between one held signal and the next held signal and in accordance with the frequency of each signal.

24. An apparatus according to claim 21, wherein said likelihood values are determined using a statistical method.

25. An apparatus according to claim 21, wherein the keyboard includes a plurality of character mode keys, one of the character mode keys being set for selecting said at least one character of said plurality of characters of the selected character key which is used for generating said signal, and further comprising display means for displaying the character in accordance with the set character mode key and selected character key.

26. An apparatus according to claim 25, wherein said display means displays a message in addition to the displayed character.

27. An apparatus according to claim 26, wherein the displayed message requests a user to take steps to at least one of verify that a correct character mode has been selected and to effect changeover to a correct character mode.

28. An apparatus according to claim 26, wherein said display means displays a message indicating the possibility that a displayed character is an incorrect character based upon the evaluation of likelihood values.

29. An apparatus according to claim 28, further comprising means for changing the displayed character displayed in accordance with the set character mode key to a correct character display based upon the evaluation of the likelihood values for the displayed character.

30. An apparatus according to claim 29, further comprising means for outputting the correct character for processing based upon the likelihood value evaluation.

31. An apparatus according to claim 25, wherein said means for evaluating includes means for converting said received signal into character codes for each of the plurality of characters and for evaluating the likelihood values for the respective character codes, and the means for selecting includes means for selecting a character code in accordance with the evaluated likelihood values and enabling changing of a character mode when the evaluated likelihood values for a character code is determined to be different from a character code for the set character mode.

32. An apparatus according to claim 31, wherein said means for enabling changing of a character mode enables changing upon evaluation of a predetermined number of received signals representing a character string of characters, said display means displaying the characters corresponding to the set character mode in accordance with the received signals and upon determining that a different character mode should utilized, at least one of displaying a message that the character mode should be changed and effecting change of the character mode.

33. An apparatus according to claim 32, wherein the display means upon determining that a different character mode should be utilized, displays a message indicative thereof.

34. An apparatus according to claim 32, wherein after said display means displays a message indicative that the character mode should be changed, said means for enabling enables a user to effect change of a character mode and the display means displays the characters in accordance with the changed character mode.

35. An apparatus according to claim 34, further comprising processing means for enabling processing of characters of the received signals in accordance with the changed character mode.

36. An apparatus according to claim 32, wherein said means for enabling changing signals includes means for effecting a summation of likelihood values for the predetermined number of received signals for a respective character mode and for effecting comparison among the summations for the respective character modes.

37. An apparatus according to claim 21, wherein said means for effecting summation includes utilizing predetermined threshold values.

38. An apparatus according to claim 21, wherein the received signal represents a plurality of destinations for a character to which the received signal is transmittable, and said means for selecting enables selection of the likeliest destination for the received signal in accordance with the evaluated assigned likelihood values thereof.

39. An apparatus according to claim 38, wherein each signal represents a character having destinations corresponding to different languages.

40. An apparatus according to claim 38, wherein said means for evaluating includes means for effecting evaluation upon receipt of a predetermined number of signals representing a character string of characters, and further comprising means for displaying the characters of the string and a message indicative of a destination based upon the likelihood values.

* * * * *